US011248859B2

(12) United States Patent
Auth et al.

(10) Patent No.: US 11,248,859 B2
(45) Date of Patent: Feb. 15, 2022

(54) WATER COLLECTION ARRANGEMENT

(71) Applicant: Baltimore Aircoil Company, Inc., Jessup, MD (US)

(72) Inventors: Christopher Auth, Catonsville, MD (US); Yohann Rousselet, Glen Burnie, MD (US); Dina Malamud, Lurtherville, MD (US); Kevin Egolf, Hampstead, MD (US); Lukasz Sztobryn, Shrewsbury, PA (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 16/858,334

(22) Filed: Apr. 24, 2020

(65) Prior Publication Data

US 2020/0256629 A1 Aug. 13, 2020

Related U.S. Application Data

(63) Continuation of application No. 15/692,585, filed on Aug. 31, 2017, now Pat. No. 10,677,543.

(51) Int. Cl.
*F28F 25/04* (2006.01)
*F28F 25/12* (2006.01)
(Continued)

(52) U.S. Cl.
CPC .............. *F28F 25/04* (2013.01); *F28C 1/14* (2013.01); *F28D 1/0443* (2013.01);
(Continued)

(58) Field of Classification Search
CPC ........ F28C 1/14; F28D 1/0443; F28D 1/0461; F28D 1/0477; F28D 1/05316; F28D 5/02;
(Continued)

(56) References Cited

U.S. PATENT DOCUMENTS 2,311,155 A * 2/1943 Carr .................... F28C 1/00
261/30
2,431,389 A 11/1947 Fleisher
(Continued)

FOREIGN PATENT DOCUMENTS

CN 102341655 A 2/2012
EP 0931993 7/1999
(Continued)

OTHER PUBLICATIONS

Amendment from U.S. Appl. No. 15/717,441, filed Apr. 9, 2020; 16 pages.
(Continued)

*Primary Examiner* — Charles S Bushey
(74) *Attorney, Agent, or Firm* — Fitch, Even, Tabin & Flannery LLP

(57) ABSTRACT

An improved water management system with improved airflow distribution for counterflow evaporative heat exchangers is provided. Such heat exchangers include open cooling towers, closed circuit cooling towers, and evaporative condensers. The improved water management system eliminates water splash out and the noise associated with water splashing. Further when the fan assemblies are located below the evaporative heat exchanger, the improved water management system keeps the fans dry and prevents freezing in subzero climates.

33 Claims, 25 Drawing Sheets

(51) Int. Cl.
*F28D 1/04* (2006.01)
*F28C 1/14* (2006.01)
*F28D 1/047* (2006.01)
*F28D 5/02* (2006.01)
*F28D 1/053* (2006.01)
*F28F 25/06* (2006.01)
*F28F 25/00* (2006.01)

(52) U.S. Cl.
CPC ......... *F28D 1/0461* (2013.01); *F28D 1/0477* (2013.01); *F28D 1/05316* (2013.01); *F28D 5/02* (2013.01); *F28F 25/12* (2013.01); *F28F 25/06* (2013.01); *F28F 2025/005* (2013.01)

(58) Field of Classification Search
CPC .. F28F 25/04; F28F 25/06; F28F 25/12; F28F 2025/005
USPC .................................. 261/97, 110, DIG. 85
See application file for complete search history.

(56) References Cited

U.S. PATENT DOCUMENTS

| | | | |
|---|---|---|---|
| 2,775,310 A * | 12/1956 | Shelton | F28C 1/02 96/249 |
| 3,290,867 A * | 12/1966 | Jacir | F28C 1/00 96/365 |
| 3,384,165 A | 5/1968 | Mathews | |
| 3,437,319 A | 4/1969 | Engalitcheff, Jr. | |
| 3,572,657 A | 3/1971 | Bradley, Jr. | |
| 3,784,171 A | 1/1974 | Engalitcheff, Jr. | |
| 4,044,078 A * | 8/1977 | Curtis | F28C 1/02 261/30 |
| 4,196,157 A * | 4/1980 | Schinner | F28D 5/02 261/155 |
| 4,198,215 A | 4/1980 | Regehr | |
| 4,218,408 A | 8/1980 | Henning | |
| 4,521,350 A | 6/1985 | Lefevre | |
| 5,268,011 A | 12/1993 | Wurz | |
| 5,545,356 A | 8/1996 | Curtis | |
| 5,645,770 A | 7/1997 | McNulty | |
| 5,958,306 A | 9/1999 | Curtis | |
| 6,237,900 B1 | 5/2001 | Drew | |
| 6,574,980 B1 | 6/2003 | Morrison | |
| 8,585,024 B2 | 11/2013 | Ferree | |
| 9,033,318 B2 * | 5/2015 | Curtis | F28C 1/00 261/153 |
| 9,273,915 B2 | 3/2016 | Patel | |
| 9,644,904 B2 | 5/2017 | Curtis | |
| 9,841,238 B2 * | 12/2017 | Curtis | F28C 1/02 |
| 9,897,399 B2 | 2/2018 | Kroeger | |
| 9,970,719 B2 | 5/2018 | Bean, Jr. | |
| 10,677,543 B2 | 6/2020 | Auth | |
| 10,775,117 B2 * | 9/2020 | Rousselet | F28F 25/12 |
| 10,852,079 B2 * | 12/2020 | Curtis | B01F 3/04049 |
| 2007/0187851 A1 | 8/2007 | Facius | |
| 2011/0049733 A1 | 3/2011 | Ferree | |
| 2011/0315350 A1 | 12/2011 | Curtis | |
| 2012/0111762 A1 | 5/2012 | Patel | |
| 2013/0276476 A1 | 10/2013 | Wong | |
| 2014/0166254 A1 | 6/2014 | Carter | |
| 2015/0330710 A1 | 11/2015 | Curtis | |
| 2016/0290745 A1 | 10/2016 | Kröger | |
| 2018/0094884 A1 | 4/2018 | Rousselet | |
| 2020/0363145 A1 | 11/2020 | Rousselet | |

FOREIGN PATENT DOCUMENTS

| | | |
|---|---|---|
| EP | 1191296 | 3/2002 |
| KR | 20110061726 | 6/2011 |
| WO | 2015071822 A1 | 5/2015 |

OTHER PUBLICATIONS

Baltimore Aircoil Company, Inc.; Series V Cooling Tower, Product & Application Handbook vol. V; publicly available before Sep. 30, 2016; 27 pages.
GOHL®, Dunstturm DT ecoTEC, Kühlturm offener Kreislauf (product brochure in German regarding forced draft tower with unhoused centrifugal fan concept); Oct. 2014, 8 pages.
International Search Report and Written Opinion from International Application No. PCT/US2018/048086, dated Oct. 29, 2018, 11 pages.
Munters Corporation; Polymer Fluid Cooler (PFC) product guide; Sep. 2015, 2 pages.
Tower Tech, Inc.; TTXR Series Technical Reference Guide; Jan. 2012, 24 pages.
U.S. Non-Final Office Action from U.S. Appl. No. 15/717,441 dated Jan. 9, 2020; 21 pages.
Chinese Office Action with English translation from related Chinese Patent Application No. 2018800637232; dated Feb. 3, 2021; 20 pages.
Invitation to Respond to Written Opinion from related Singapore Patent Application No. 11202001746T; dated Feb. 18, 2021; 7 pages.
Extended European Search Report from related European Patent Application No. 18850404.7 dated Mar. 31, 2021; 7 pages.
U.S. Non-Final Office Action from U.S. Appl. No. 16/945,282 dated Jun. 23, 2021; 23 pages.

* cited by examiner

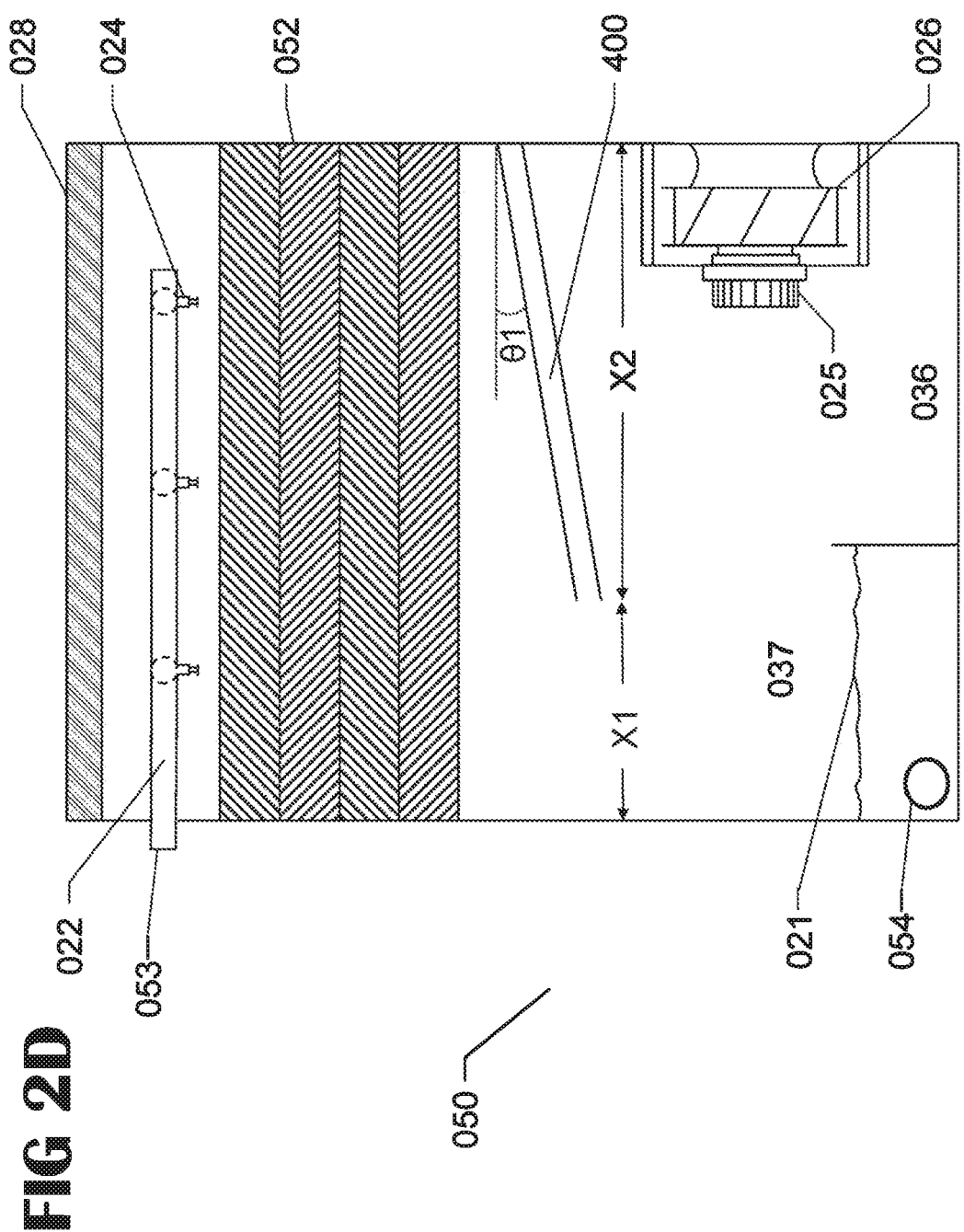

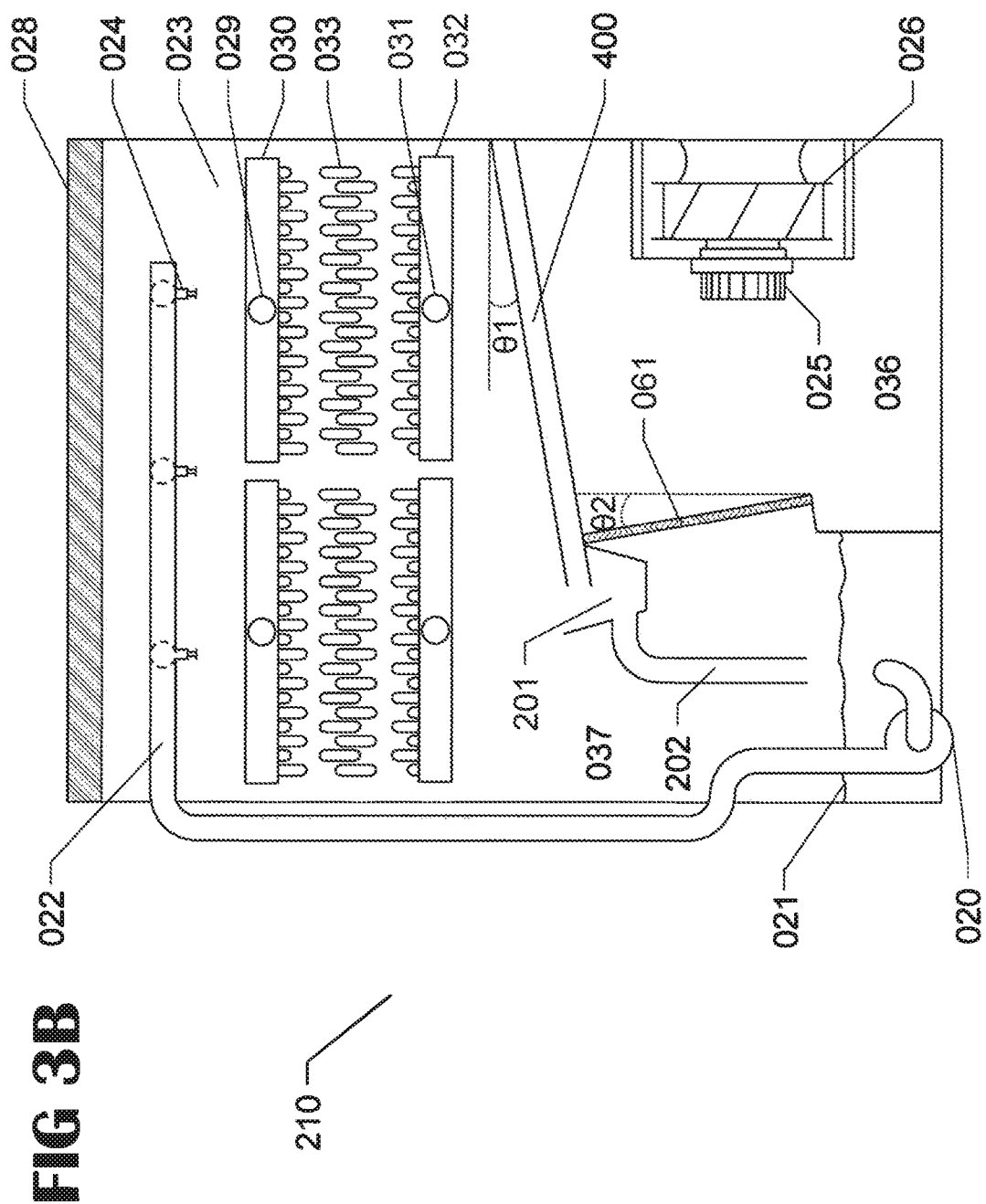

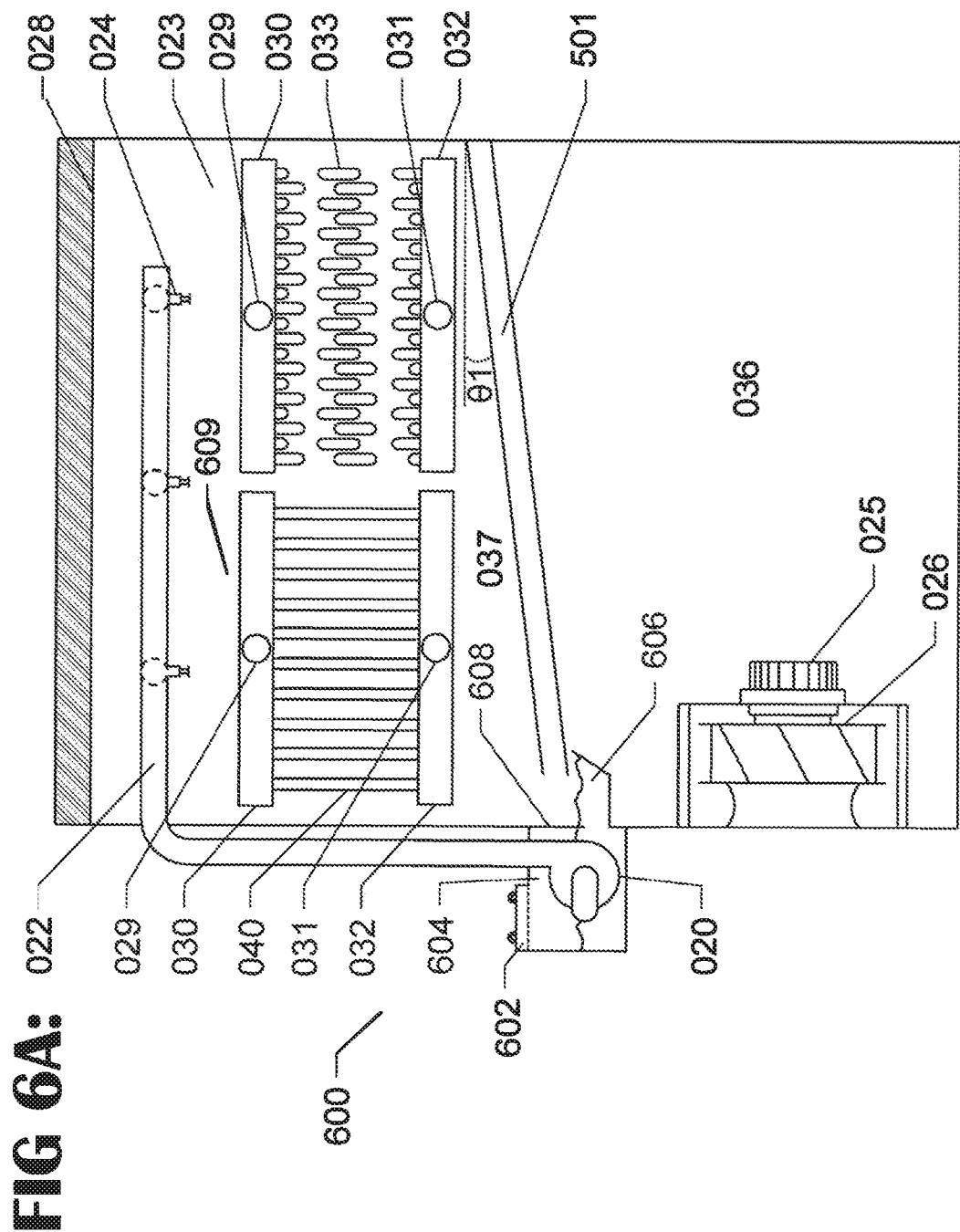

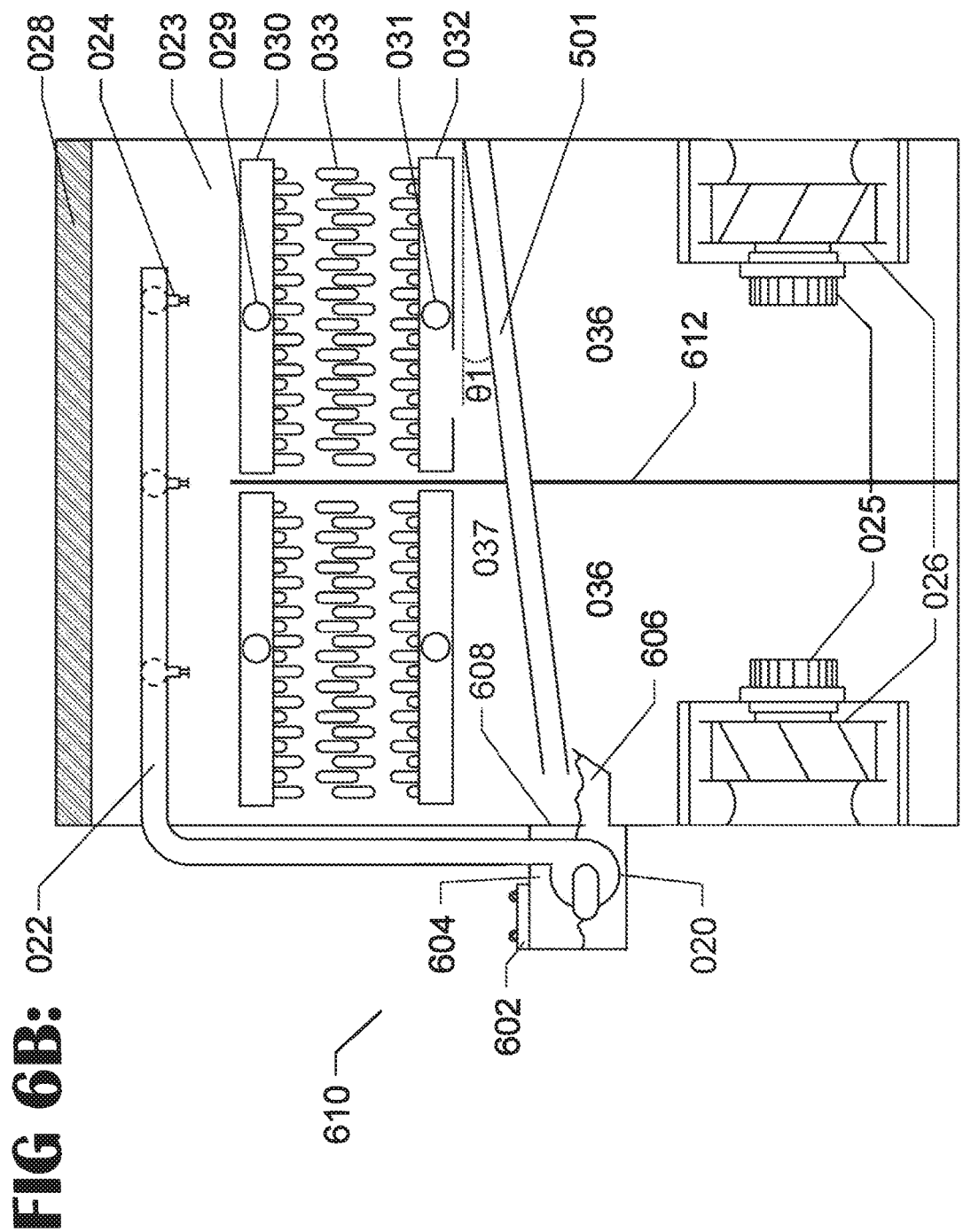

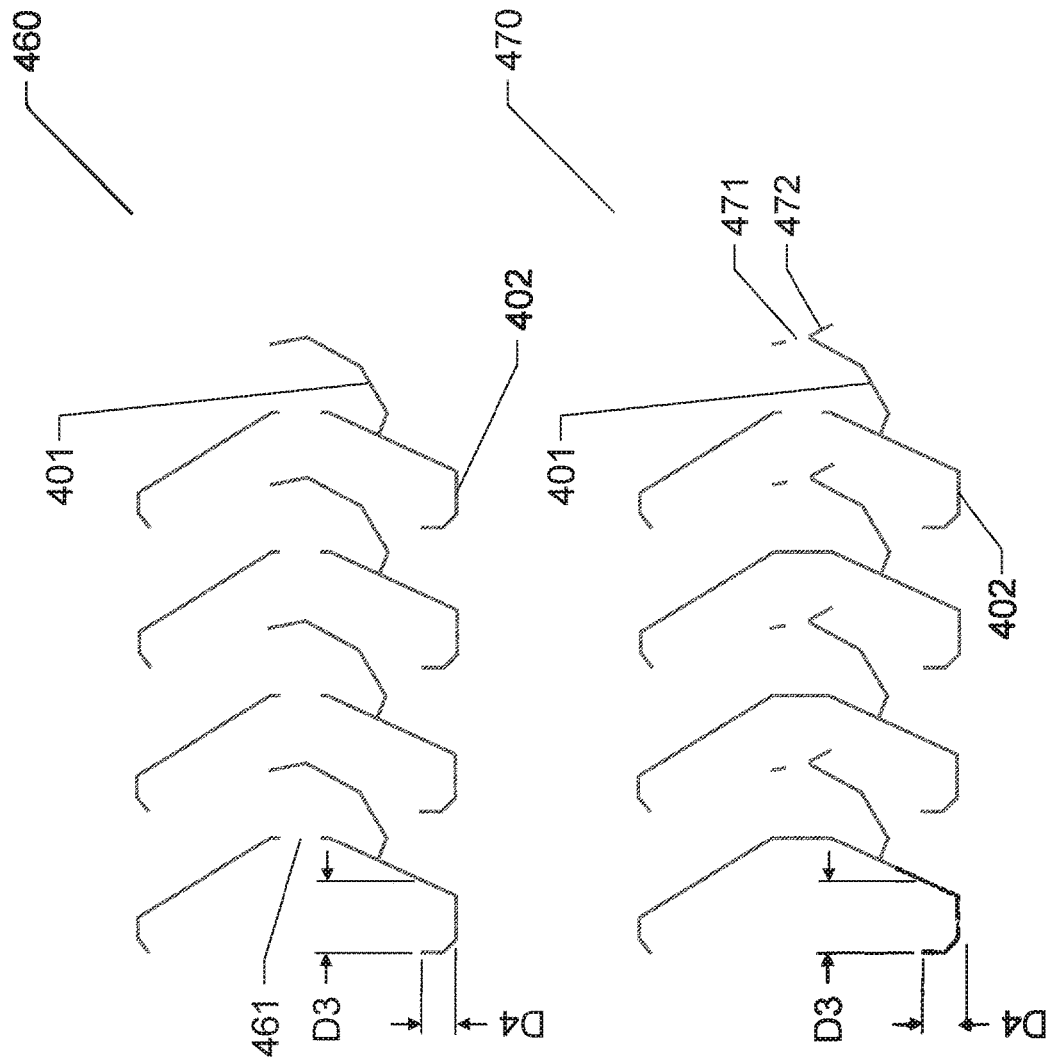

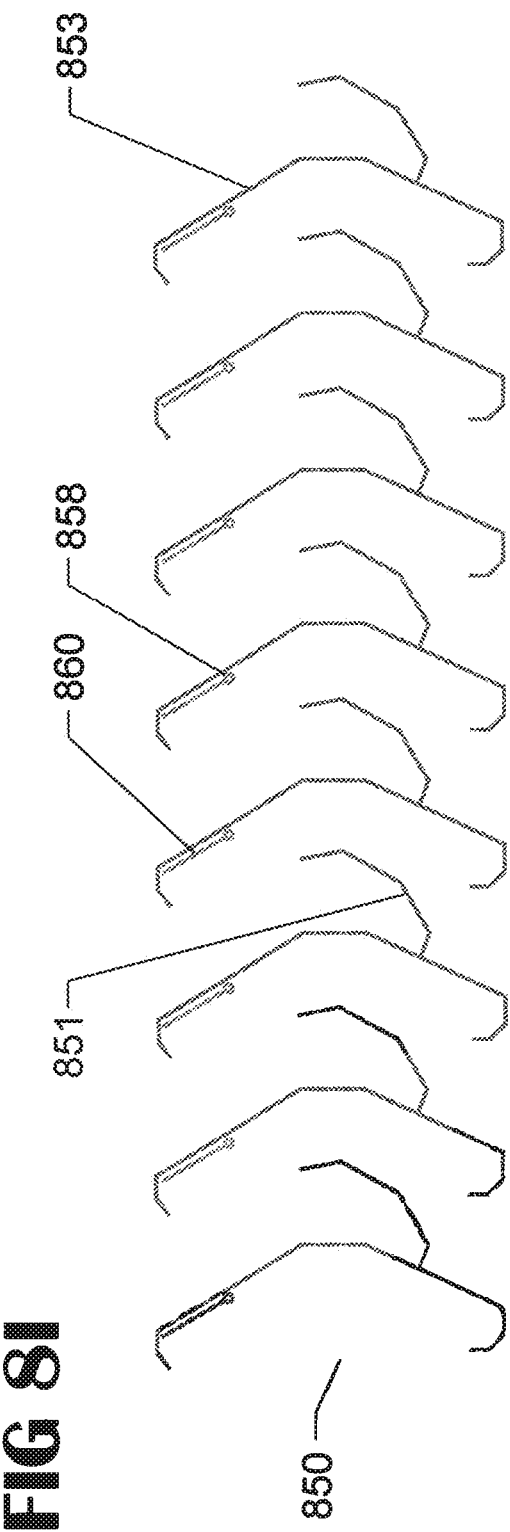
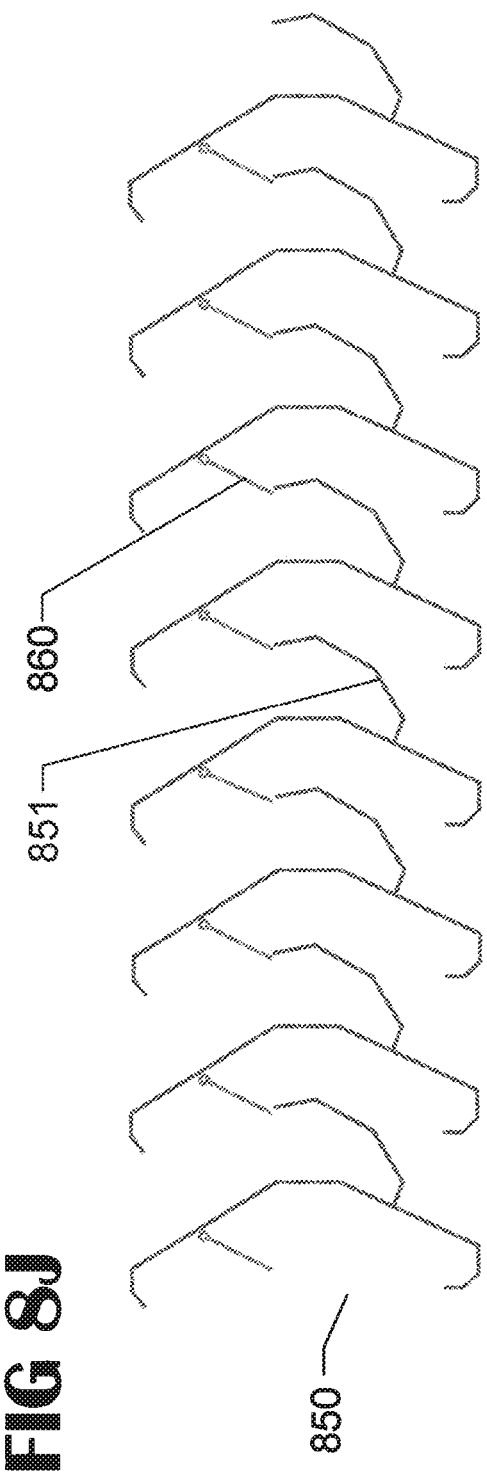

WATER COLLECTION ARRANGEMENT

CROSS REFERENCE TO RELATED APPLICATION

This application is a continuation of U.S. patent application Ser. No. 15/692,585, filed Aug. 31, 2017, now U.S. Pat. No. 10,677,543, which is hereby incorporated by reference herein in its entirety.

BACKGROUND AND SUMMARY OF THE INVENTION

This invention concerns evaporative cooling towers, fluid coolers and evaporative condensers, and specifically the amelioration of the air and spray water flow within the evaporative cooling equipment. This invention improves air distribution while reducing airflow resistance to increase the thermal capacity for a given footprint of the evaporative cooling tower. In addition, this invention seeks to provide self-cleaning, easy to access, inspect and maintain evaporative cooling equipment.

The improvement in airflow distribution, and decrease in airflow resistance, is achieved by reducing the amount of obstruction and turns in the airflow path, and by opening the plenum area around the fan. Typical forced draft evaporative cooling equipment with side inlet fans have uneven airflow distribution to the heat exchanger arranged above the fan. Solid baffles or fan housings are typically arranged to shield the mechanical and fan components from the falling water droplets through the heat exchanger. Given the near perpendicular arrangement of the entering air velocity provided by the fan, the turning losses to the heat exchanger contribute significantly to the total static pressure acting against the fan and increased fan energy consumption for a given airflow. For forced draft evaporative cooling equipment using an unhoused fan, the fans and fan plenum are separated from the heat exchanger for water management concerns, and are not positioned directly under the heat exchanger section, resulting in poor fan performance due to higher airflow resistance, large unit footprint and higher unit cost due to the side-by-side heat exchanger and fan sections.

In this invention, improved overlapping gutter water collection systems are introduced to improve airflow distribution, decrease airflow resistance and improve the water collection system design. A new embodiment has the spray water pump being mounted above the forced draft fan(s) and another new embodiment includes integral air activated dampers which open when the fan(s) is on and close when the fan(s) is off thus stopping natural airflow when the fan is off and prevents any water droplets from exiting the water collection system when the fan is off.

The overlapping gutter water collection systems are designed to collect the spray water flowing from the top side, while letting air flow generally vertically through from the bottom side. The system is made of single-piece gutter assemblies stacked side by side and overlapping. In some embodiments presented, the water collection system may cover only part of the footprint of the unit which allows for fine balancing of the airflow resistance and greater control of the airflow paths through the units. When covering only part of the unit footprint, and by being sloped, the water collection systems create a water cascade from the water collection channels to the sump. The cascading water is mixed with air passing through which becomes an extended rain zone, which allows for additional cooling of the spray water resulting in higher unit thermal performance. Other embodiments presented have the complete footprint of the unit covered by the overlapping gutter water collection systems.

One improvement of the invention presented is that the sloped overlapping water gutter collection system assemblies are composed of two water collection channels: a primary water collection channel that collects most of the spray water, and a secondary water collection channel that collects the remaining spray water. Another embodiment introduces even a tertiary water collection channel. All of the channels are made wide enough to prevent clogging due to debris and other factors, and to be easily inspected and cleaned, as needed. The air passages of the gutter assemblies are designed to minimize airside pressure drop while improving water collection performance. Drip edges are added to improve water catching performance, as necessary. If water splash out is a concern, a water collection trough can be incorporated in the design, at the discharge side of the water collection channels of the gutter system. The spray water is collected in the trough, and can drain to the sump via a pipe, under the action of gravity, reducing the amount of water splashing in the sump. In addition, louvers can be added under the water collection system to isolate the sump area from the fan area. If high water collection capacities are required, a design with three integrated water collection channels can be used. The gutter assemblies could be parallel or perpendicular to the direction of the air intake, depending on the needs of the application. In some embodiments, overlapping water gutter collection systems can also act as water silencers by catching most or some of the spray, shortening the waterfall distance from the heat exchanger to the sump. In some embodiments, when the fans are operating, the water falling from the gutter assembly which collects a portion of the evaporative liquid, usually water, is forced to back side wall. In operation this reduces splashing potential, cleans the back side wall and reduces splashing water noise. In some embodiments the sump is located within the outside structure of the cooling tower. In other embodiments the sump can be located remotely from the cooling tower or the sump is mounted externally to the outside of the cooling tower.

The hygiene, self-cleaning, easy to access, easy to inspect and easy to maintain aspects of this invention are realized by the overlapping gutters protecting mechanical components from falling water from the heat exchanger, allowing dry internal access between the sump and fan for inspection and maintenance. In addition, overlapping gutters are at an angle, typically greater than 0° and less than 80°, where 0° refers to a horizontal plane, with optimal angle between 1° and 5°, to increase water velocity and drainage, resulting in a self-cleaning system. The slope also results, in some embodiments, in water cascading in the sump. This high velocity water stream can increase water movement in the sump, thus reducing the risk of biological growth from stagnant sump areas. In addition, a cleaning system could be integrated to the water collection gutter designed, providing a pressurized and gravity driven water stream to flush out the water collection channels. Finally, keeping the spray water as far away from the air intake as possible greatly reduces to risk of water splashing out through the fan, and the risk of freezing in the winter, especially when the fans are not in operation.

For most embodiments presented, evaporative cooling equipment is in forced draft, single-sided air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

BRIEF DESCRIPTION OF THE DRAWINGS

In the drawings:

FIG. 2D is a side view of an evaporative direct heat exchanger product in accordance with a third embodiment of the present invention;

FIG. 3B is a side view of an evaporative indirect heat exchanger product in accordance with a fifth embodiment of the present invention;

FIG. 6A is a side view of an evaporative indirect heat exchanger product in accordance with a twelfth embodiment of the present invention;

FIG. 6B is a side view of an evaporative indirect heat exchanger product in accordance with a thirteenth embodiment of the present invention;

FIG. 8D is a front side view of a sub-section of an overlapping gutter water collection system in accordance with a nineteenth embodiment of the present invention;

FIG. 8E is a front side views of a sub-section of an overlapping gutter water collection system in accordance with a twentieth embodiment of the present invention;

FIG. 8I is a front side view of a sub-section of an overlapping gutter water collection system in accordance with a twenty-third embodiment of the present invention;

FIG. 8J is a front side view of a sub-section of an overlapping gutter water collection system in accordance with a twenty-third embodiment of the present invention.

DETAILED DESCRIPTION

Figure 1:
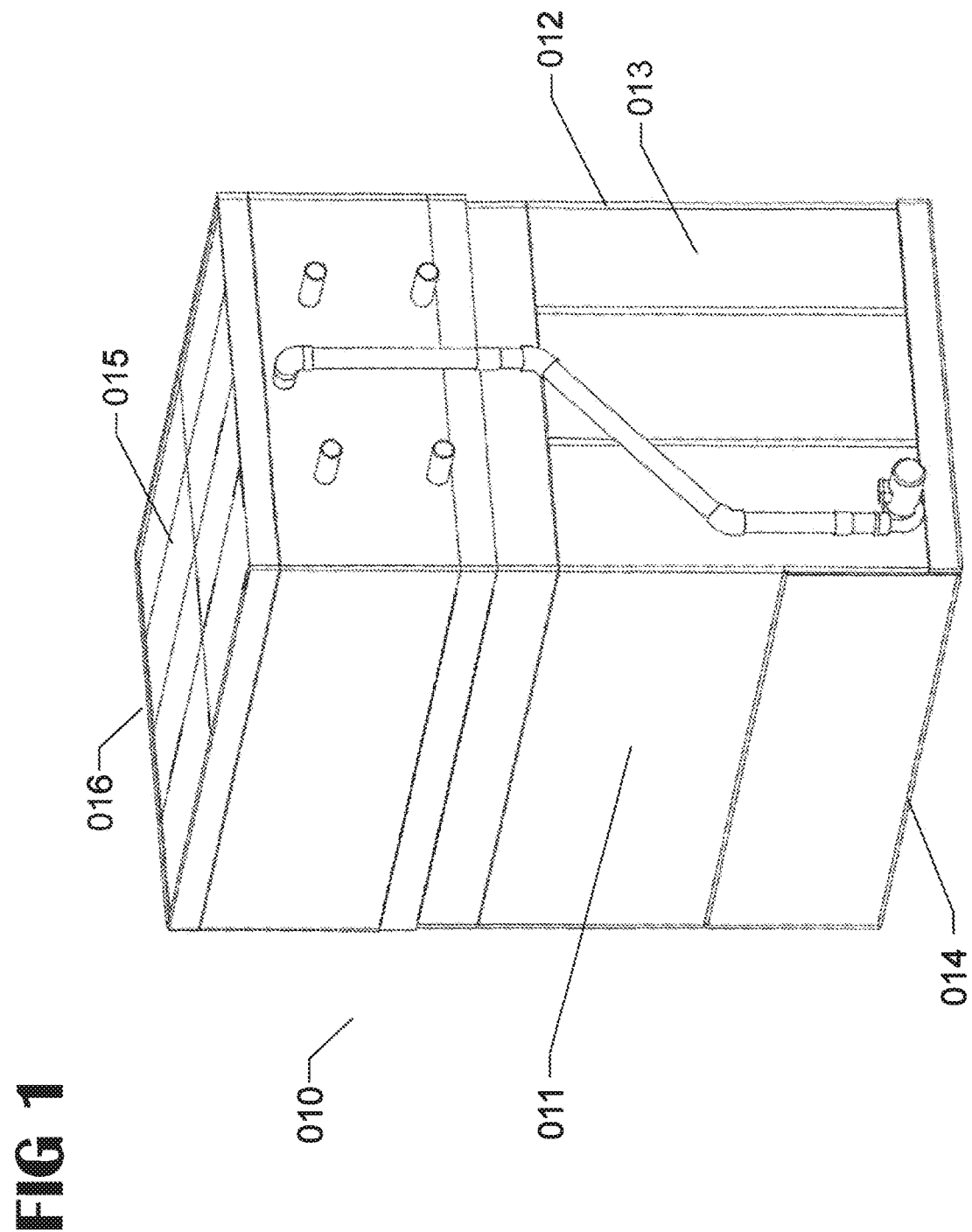
FIG. 1 is a perspective view of an evaporative indirect heat exchanger product in accordance with a first embodiment of the present invention.

Referring now to the Figures and particularly FIG. 1, an evaporative indirect heat exchanger product apparatus generally designated by 010 is shown. The apparatus has four vertical sides that include a connection end 013, an opposite to connection end 016, an air inlet end 012, and an opposite to air inlet end 011. The apparatus also has a bottom end 014 and a top air discharge end 016.

Figure 2A:
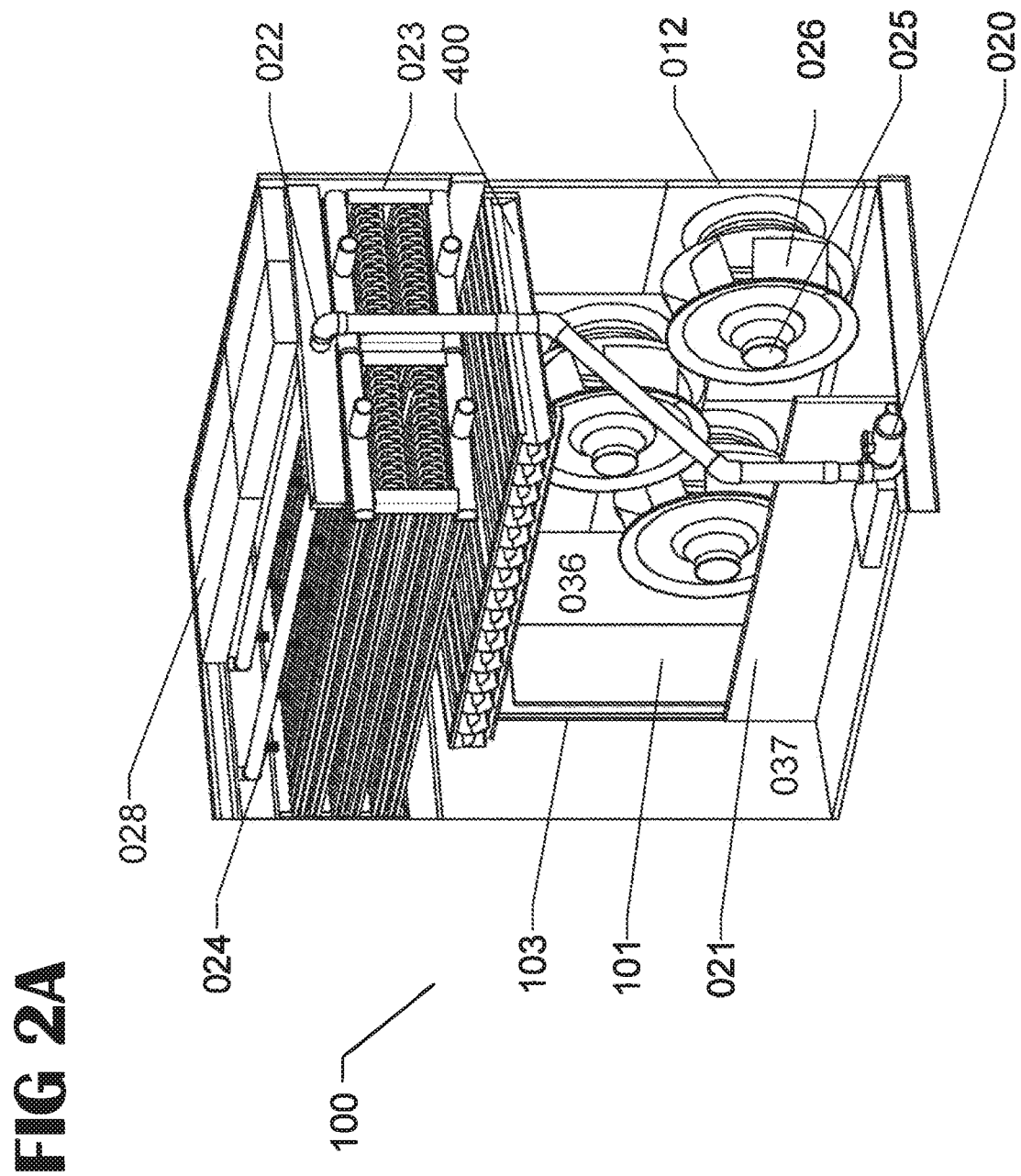
FIG. 2A is a perspective view of an evaporative indirect heat exchanger product in accordance with a first embodiment of the present invention.

Now referring to FIG. 2A, the side panels of FIG. 1 have been removed to show some of the internal components in a three dimensional viewpoint. Evaporative indirect heat exchanger product apparatus 100 is shown with spray pump 020, fan motor 025, fan 026, fan casing panel 012, water collection system 400, indirect serpentine tube heat exchangers 023, spray water distribution system 022, mist eliminators 028, spray water nozzles 024, rear water collection support 103, inspection door 101, and spray water sump 021. As will be later explained, area 036 in the vicinity of fan 026 and fan motor 025 below water collection system 400 is denoted as the dry area 036, while the area to the left and below water collector system 400 is denoted as wet area 037.

Figure 2B:
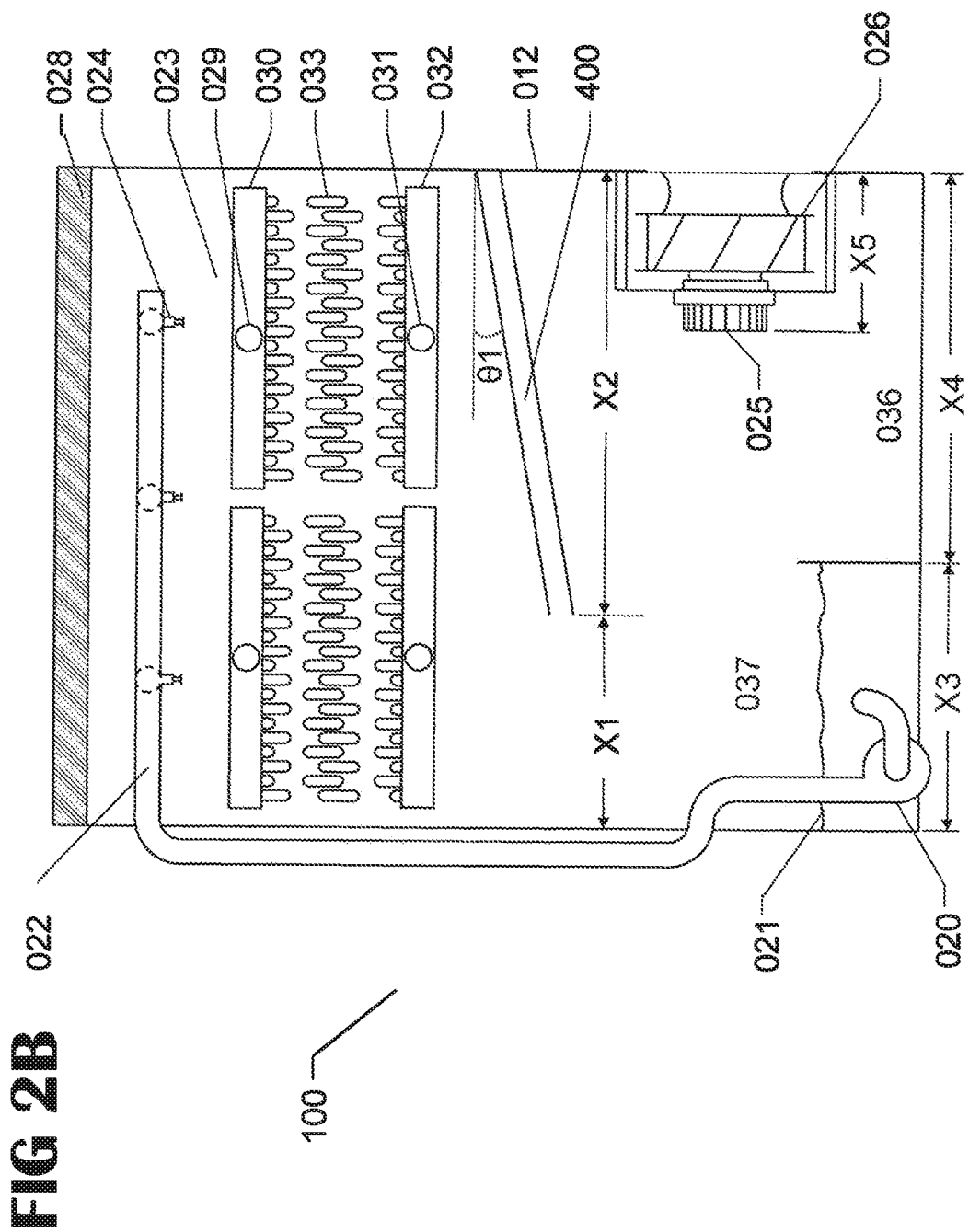
FIG. 2B is a side view of an evaporative indirect heat exchanger product in accordance with a first embodiment of the present invention.

Now referring to FIG. 2B, the main internal and external components of embodiment 100 are better identified from a side sectional view of connection end. Similar components are numbered as in FIG. 2A. Hot process fluid may enter indirect heat exchanger 023 from top inlet connection(s) 029 to be distributed through top heat exchanger header 030 through serpentine tube circuits 033 to be collected by bottom header exchanger header 032 to leave cooled process fluid exiting through bottom outlet connection(s) 031. Process fluid is indirectly cooled from air forced through heat exchanger by fan 026 and cooled water collected from sump 021 by pump 020 to be distributed to top of heat exchanger through piping 022 and spray nozzles 024. A mist eliminator section 028 is typically installed above spray nozzles 024 to remove water from the air discharge. As shown in FIG. 2B, embodiment 100 is an evaporative indirect heat exchanger product which could be a closed circuit cooling tower or an evaporative condenser, with an overlapping gutter water collection system 400, in accordance with a first embodiment of the present invention. Note that overlapping gutter water collection system 400 does not span the full footprint of the embodiment such that a portion of the air goes through overlapping gutter water collection system 400 and some of the air freely bypasses around it. The length X2 of overlapping gutter water collection system and width X3 of sump 021 in the present embodiment would allow for a minimum distance, X4-X5 of 24 inches for maintenance access to dry area 036 via an optional door 101 as shown in FIG. 2A. As shown in FIG. 2B, the overlapping gutter water system 400 extends from the fan inlet end 012 and shadows or overhangs part of the sump 021, such that distance X2 is greater than distance X4. Distance X2-X4 or X3-X1, is greater than 0 inch and ideally greater than 5 inches to assure that virtually no water reaches dry area 036, including times when the fan 026 is rotating slowly or is not operating. The overlapping gutter water system 400 is sloped such that water freely flows towards and cascades into sump 021 under the effect of gravity. The slope of overlapping gutter water system 400, defined by angle θ1, is typically greater than 0° and less than 80°, with optimal angle θ1 between 1° and 5°.

For most of the embodiments presented, evaporative cooling equipment is in forced draft, single-singled air inlet configuration but it is not a limitation of the invention. Many Figures are shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiments presented. Additionally, motor 025 may be directly connected to the fan 026 as shown, be belt drive, or gear drive. It should be understood that the process fluid direction may be reversed to optimize heat transfer and is not a limitation to the embodiment presented. It also should be understood that the number of circuits and the number of passes or rows of tube runs within a serpentine indirect heat exchanger is not a limitation to embodiments presented. Furthermore, it should be understood that the type of indirect heat exchangers is not a limitation to embodiments presented. In addition, any evaporative heat exchanger falls within the scope of this invention, whether it is an indirect, direct or a combination of an indirect and a direct evaporative heat exchanger. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 2C:
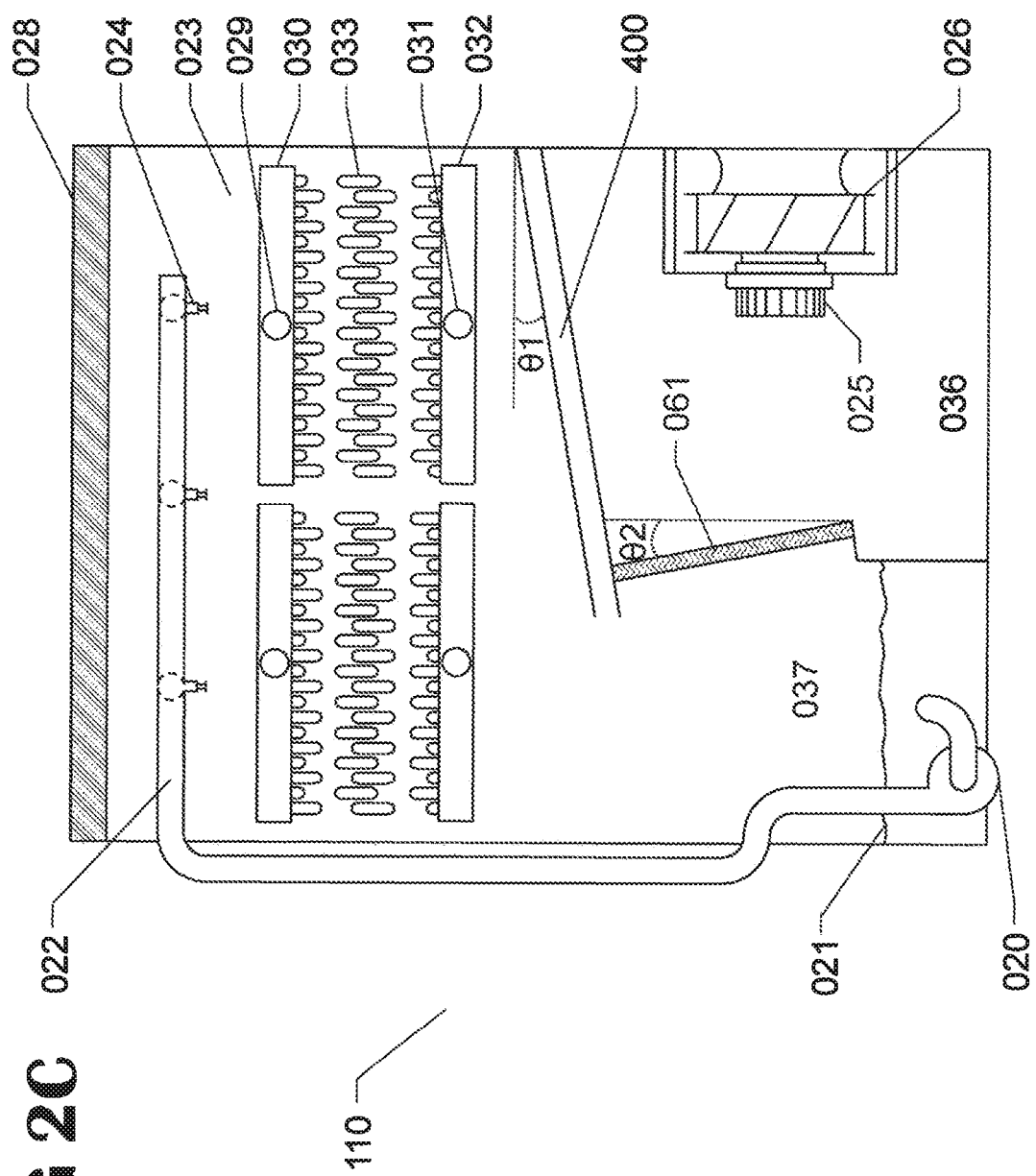
FIG. 2C is a side view of an evaporative indirect heat exchanger product in accordance with a second embodiment of the present invention.

The second embodiment 110 of the present invention is shown in FIG. 2C. Embodiment 110 describes an alternative arrangement to that of the first embodiment 100 shown in FIGS. 2A and 2B, with louvers 061 separating dry region 036 and wet region 037. The use of louvers 061 in the opening between sump 021 and overlapping gutter water system 400 assures that virtually no water will reach dry area 036 surrounding motor 025 and fan 026, ensuring a clean and safe environment around the fans for easy access and maintenance. Angle θ2 between overlapping gutter water system 400 and louvers 061 is typically less than 90°+θ1, to assure that virtually no water can get to dry area 036 through the louvers 061 which is especially important when fan 026 is either rotating very slowly or not at all while spray pump 020 is in operation.

As shown in FIG. 2D, third embodiment 050 is an open cooling tower with a direct heat exchanger section 052, which usually is comprised of fill sheets. FIG. 2D has similar components numbered the same as FIG. 2B. Water collection system 400 in accordance with the third embodiment of the present invention operates exactly as was discussed in FIG. 2B except for the heat exchanger is now a direct evaporative heat exchanger 052. Water to be cooled enters water distribution 053 and is sprayed from spray water pipe 022 from nozzles 024 onto direct heat exchanger 052. Instead of having a spray pump as shown in FIG. 2B, cooled process water exists the open cooling tower 050 from exit connection 054.

Figure 3A:
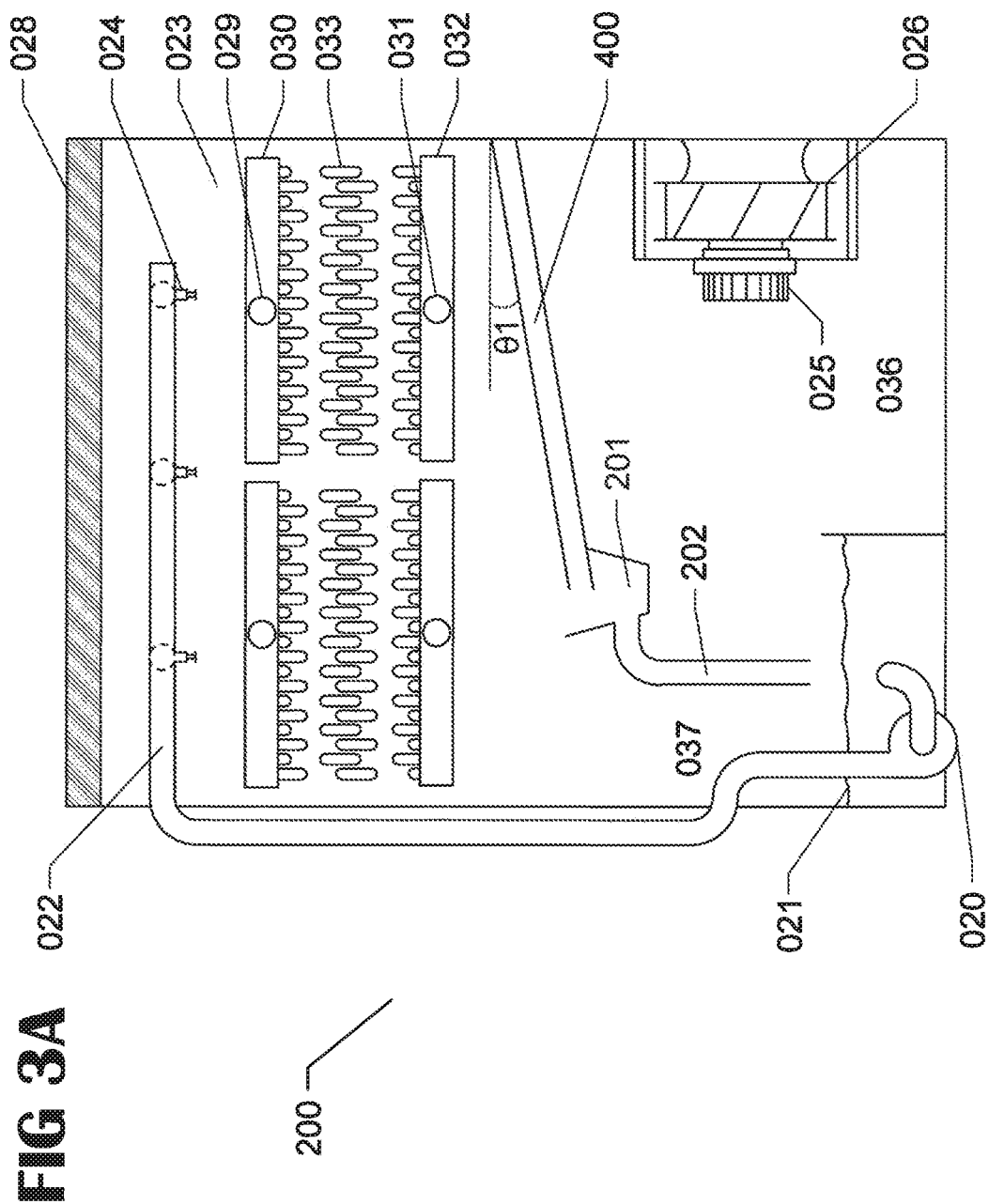
FIG. 3A is a side view of an evaporative indirect heat exchanger product in accordance with a fourth embodiment of the present invention.

A fourth embodiment is shown in FIG. 3A with similar components numbered the same as FIG. 2B. As shown in FIG. 3A, embodiment 200 is an evaporative indirect heat exchanger product which could be a closed circuit cooling tower or an evaporative condenser, with an overlapping gutter water collection system 400, in accordance with a fourth embodiment of the present invention. Gutter assemblies of overlapping gutter water system 400 of embodiment 200 are similar to that of previous embodiments. As shown in FIG. 3A, the overlapping gutter water system 400 only extends through part of the footprint of the unit. The water collected by the gutter assemblies of the overlapping gutter water system 400 is funneled to a water collection trough 201, from which it will drain to the sump 021 under the effect of gravity, via a drain 202. Additionally, overlapping gutter water system 400 design, and sump 021 width can be adjusted to optimize the ratio between dry region 036 and wet region 037. Finally, it should be understood size and of the water collection trough 201, as well as the length and nature of the drain 202 and the width and depth of the sump 021, are not a limitation of the present embodiment.

A fifth embodiment of the present invention is shown in FIG. 3B. The fifth embodiment 210 describes an alternative arrangement to that of the fourth embodiment 200 shown in FIG. 3A, with added louvers 061 now separating dry region 036 from wet region 037. The use of louvers 061 assures that virtually no water will reach the dry area surrounding the motor 025 and fan 026, ensuring a clean and safe environment around the fans for easy access and maintenance. It should be understood size and of the water collection trough 201, as well as the length and nature of the drain 202, the type and size of the louvers 061 and the width and depth of the sump 021, are not a limitation of the present embodiment. Additionally, overlapping gutter water system 400 design, and sump 021 width can be adjusted to optimize the ratio between dry region 036 and wet region 037.

Figure 4A:
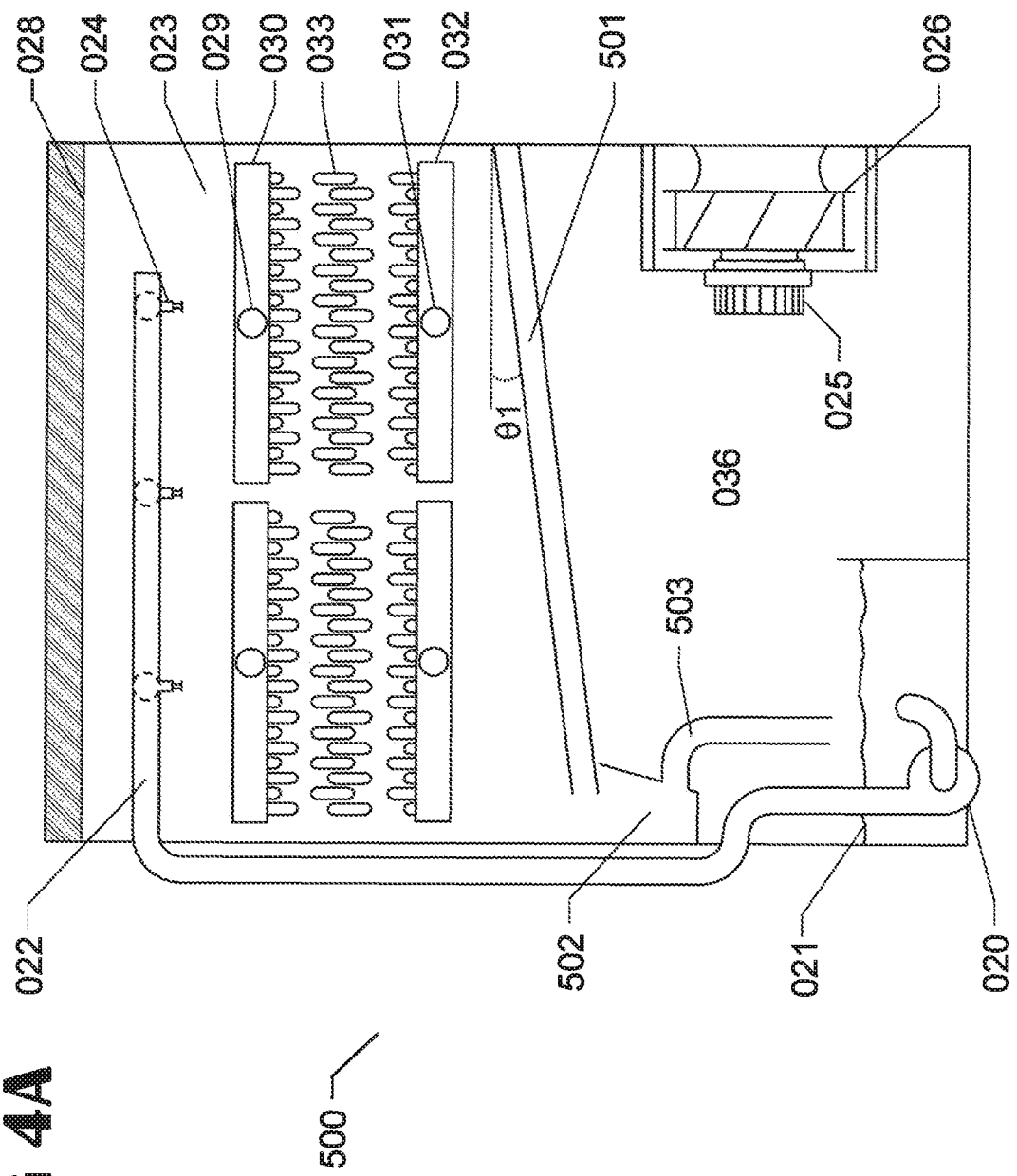
FIG. 4A is a side view of an evaporative indirect heat exchanger product in accordance with a sixth embodiment of the present invention.

A sixth embodiment is shown in FIG. 4A. Similar components have similar numerals as FIG. 2B. As shown in FIG. 4A, embodiment 500 is an evaporative indirect heat exchanger product which could be a closed circuit cooling tower or an evaporative condenser, with an overlapping water gutter system 501, in accordance with a sixth embodiment of the present invention. It should be noted that in this embodiment, all of the air flowing through indirect heat exchangers 023 first goes through overlapping gutter water gutter system 501. Gutter assemblies of overlapping gutter water gutter system 501 of embodiment 500 could be similar to that of previous embodiments but now span the full footprint of embodiment 500. As shown in FIG. 4A, the overlapping gutter water gutter system 501 extends almost through the entire unit, resulting in dry area 036 which is now the entire volume underneath overlapping gutter water gutter system 501. The water collected by the overlapping gutter water gutter system 501 is funneled to a water collection trough 502, from which it drains to the sump 021 under the effect of gravity, via a drain 503. Angle θ1 of the overlapping gutter water collection system 501 is typically greater than 0° and less than 80°, with optimal angle between 1° and 5°. It should be understood that the size and shape of the water collection trough 502, as well as the length and nature of the drain 503, and the width and depth of the sump 021, are not a limitation of the present embodiment.

Figure 4B:
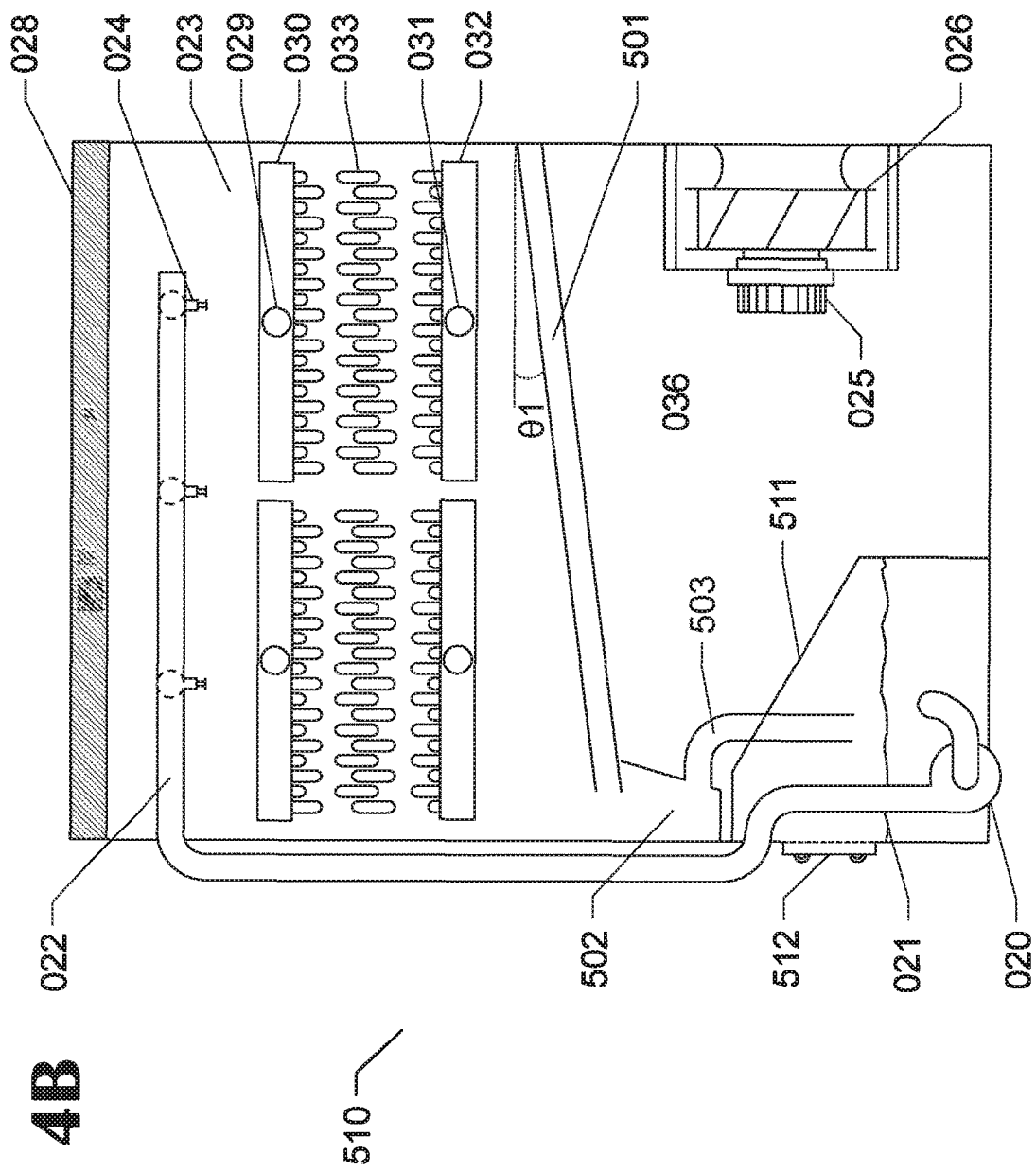
FIG. 4B is a side view of an evaporative indirect heat exchanger product in accordance with a seventh embodiment of the present invention.

A seventh embodiment of the present invention is shown in FIG. 4B. The seventh embodiment 510 describes an alternative arrangement to that of the sixth embodiment 500, in which the sump 021 can be inspected while the fan 026 and spray pump 020 are in operation. Gutter assemblies of overlapping gutter water gutter system 501 of embodiment 510 could be similar to that of previous embodiments. Solid panel 511 is used to isolate sump 021 and associated make-up and sump heater devices (not shown) from the air stream. Solid panel 511 is designed to accommodate drain 503 connecting the water collection trough 502 to the sump 021. Accessibility to the sump 021 from the outside of the unit is made possible by the presence of access door 512 or optionally, solid panel 511 could be made removable. Angle θ1 of the overlapping gutter water collection system 501 is typically greater than 0° and less than 80°, with optimal angle between 1° and 5°. It should be understood that the size and of the water collection trough 502, as well as the length and nature of the drain 503, the width and depth of the sump 021, the shape and size of the solid panel 511, and the shape, size and location of the access door 512 are not a limitation of the present embodiment.

Figure 4C:
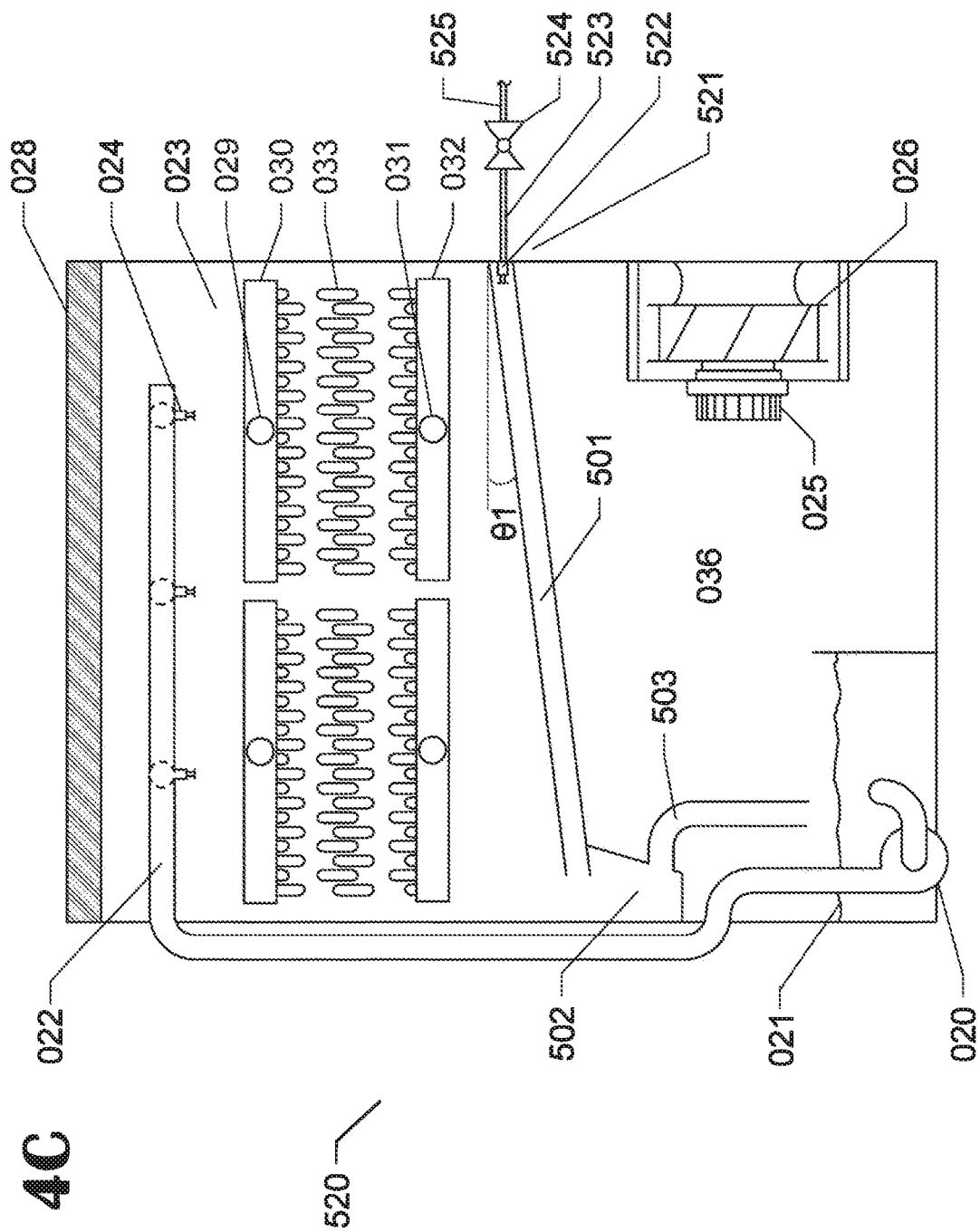
FIG. 4C is a side view of an evaporative indirect heat exchanger product in accordance with an eighth embodiment of the present invention.

An eighth embodiment of the present invention is shown in FIG. 4C. The eighth embodiment 520 describes an alternative arrangement to that of the sixth or seventh embodiments in which overlapping gutter water gutter system 501 is equipped with a cleaning system 521, to prevent clogging of the gutters. For each gutter assembly, the cleaning system is composed of a nozzle 522, water supply line 523, control valve 524 and connection to a water supply 525. Cleaning water can be water from the network, spray water from the sump, make-up water, recycled or any clean available pressurized water supply. The cleaning water source is not a limitation of the embodiment. Note that gutter cleaning system 521 can be added to all disclosed embodiments. Gutter assemblies of overlapping gutter water gutter system 521 of embodiment 520 could be similar to that of previous embodiments. Angle θ1 of the overlapping gutter water collection system 501 is typically greater than 0° and less than 80°, with optimal angle between 1° and 5°. Finally, it should be understood that the size and of the water collection trough 502, as well as the length and nature of the drain 503, and the width and depth of the sump 021, are not a limitation of the present embodiment.

Figure 4D:
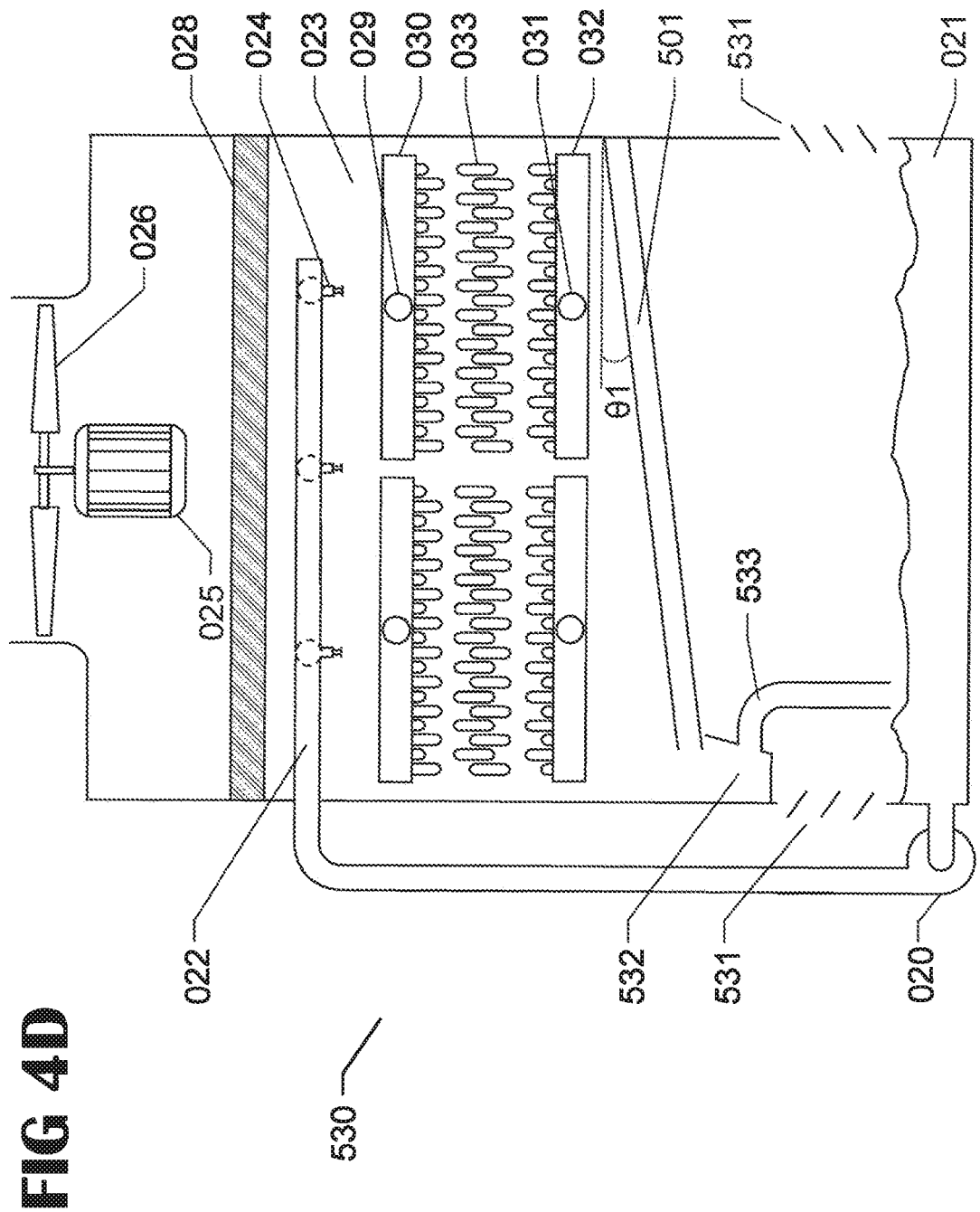
FIG. 4D is a side view of an evaporative indirect heat exchanger product in accordance with a ninth embodiment of the present invention.

A ninth embodiment of the present invention is shown in FIG. 4D. Ninth embodiment 530 describes an alternative arrangement to that of the sixth embodiment 500, in which the air is induced through the evaporative heat rejection equipment through inlet louvers 531 by the fan 026 driven by motor 025. Gutter assemblies of overlapping water gutter system 501 of embodiment 530 could be similar to that of previous embodiments. As shown in FIG. 4D, the overlapping water gutter system 501 extends almost through the entire unit, resulting in dry area 036 which is now the entire volume underneath overlapping gutter water gutter system 501. The water collected by the overlapping gutter water gutter system 501 is directed to water collection trough 532, from which it drains to sump 021 under the effect of gravity, via drain 533. Angle 01 of the overlapping gutter water collection system 501 is typically greater than 0° and less than 80°, with the optimal angle between 1° and 5°. It should be understood that the size and of the water collection trough 532, as well as the length and nature of the drain 533, the width and depth of the sump 021, the shape and size of the solid panel 511, and the shape, size and location of the inlet louvers 531 are not a limitation of the present embodiment.

Figure 5A:
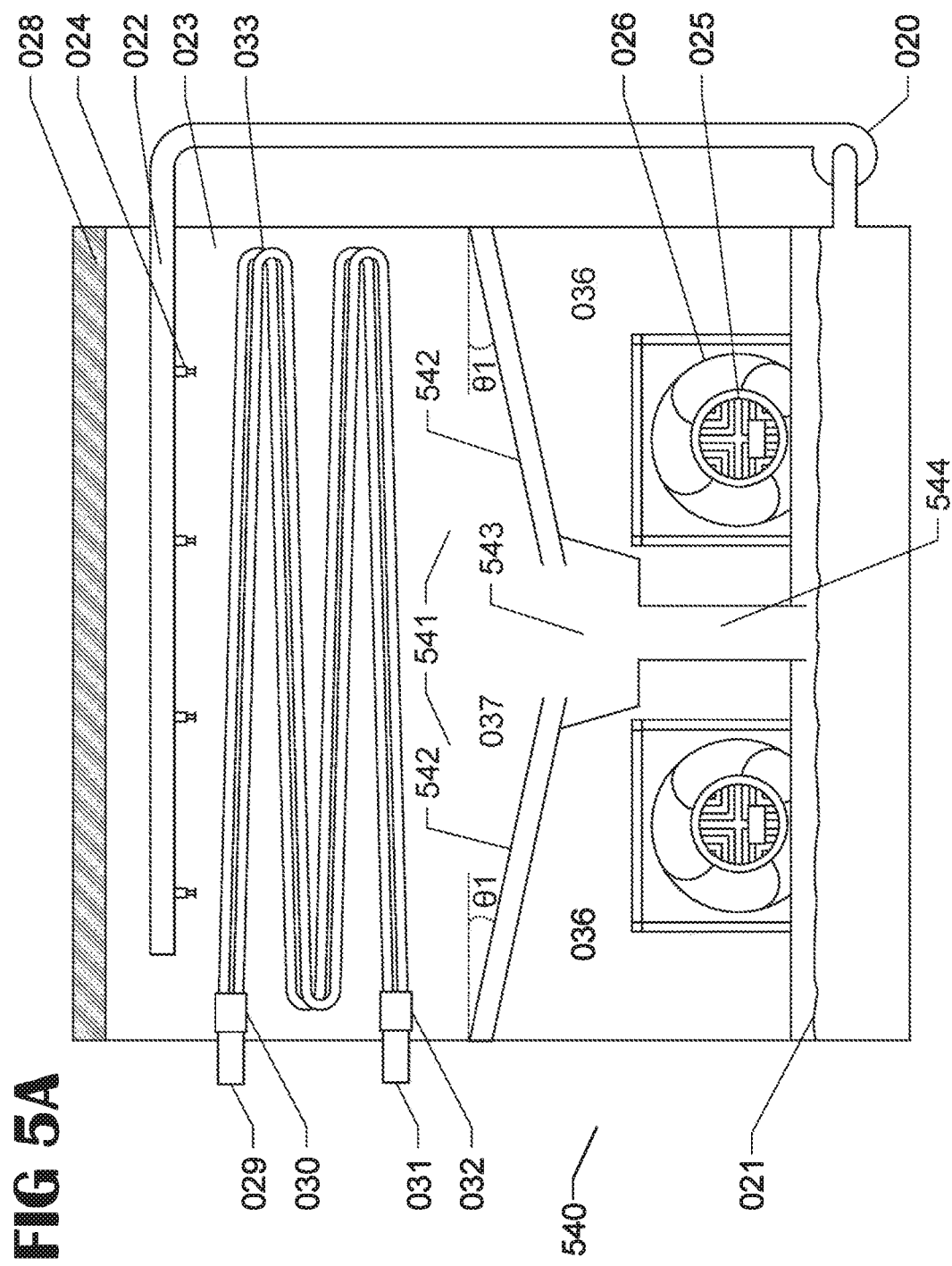
FIG. 5A is a side view of an evaporative indirect heat exchanger product in accordance with a tenth embodiment of the present invention.

A tenth embodiment is shown in FIG. 5A. Similar components have similar numerals as per FIG. 2B in FIGS. 5A and 5B. FIG. 5A shows a backside view, through the blank-off face 011 (defined in FIG. 1) of embodiment 540, which is an evaporative indirect heat exchanger product which could be a closed circuit cooling tower or an evaporative condenser, with an overlapping water gutter system 541, in accordance with a tenth embodiment of the present invention. Gutter assemblies of overlapping water gutter system 541 of embodiment 540 could be similar to that of previous embodiments. The overlapping gutter assemblies 542 of the water collection system 541 of embodiment 540 are sloped towards the center of the embodiment 540 where angle θ1 of the overlapping gutter water collection system 542 is typically greater than 0° and less than 80°, with optimal angle between 1° and 5°, so as to direct the water towards a central water collection trough 543, from which the water drops by gravity to sump 021 via drain 544. Water collection system 541 may optionally extend through only part of the footprint of embodiment 540 as shown in FIGS. 2A, 2B, 2C, 2D, 3A and 3B creating wet and dry regions 037 and 036 respectively as presented in those Figures. Water collection system 541 may also optionally extend the full footprint where all the air must pass through overlapping gutter assemblies 542 as shown in FIGS. 4A, 4B, 4C and 4D thus creating dry area 036 below overlapping gutter assemblies 542. It should be understood that the angle and length of the overlapping gutter water gutter system 541, the size and of the water collection trough 543, as well as the length and nature of the drain 544, and the width and depth of the sump 021, are not a limitation of the present embodiment.

Figure 5B:
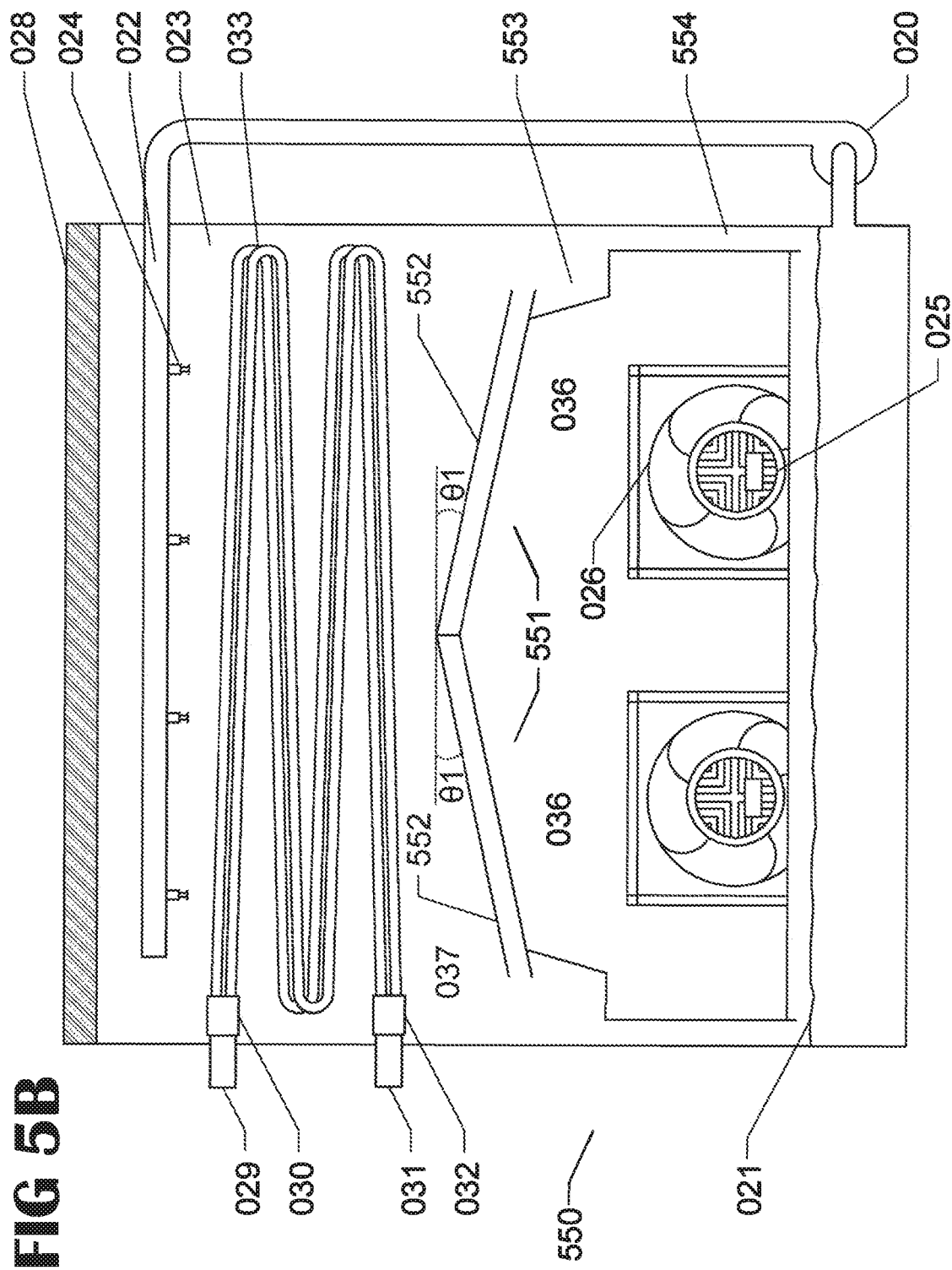
FIG. 5B is a side view of an evaporative indirect heat exchanger product in accordance with an eleventh embodiment of the present invention.

An eleventh embodiment 550 of the present invention is shown in FIG. 5B describing another way to optimize airflow and water management, with an overlapping gutter water gutter system 551. Gutter assemblies of overlapping gutter water gutter system 551 of embodiment 550 could be similar to that of previous embodiments. Compared to that of embodiment 540 shown in FIG. 5A, the overlapping gutter assemblies 552 of the water collection system 551 of embodiment 550 are sloped towards the sides of the unit, and angle θ1 of the overlapping gutter water collection system 541 is typically greater than 0° and less than 80°, with optimal angle between 1° and 5° so as to direct the water towards lateral central water collection troughs 553 from which the water circulates to the sump 021 via a drain 554. Water collection system 551 may optionally extend through only part of the footprint of embodiment 550 as shown in FIGS. 2A, 2B, 2C, 2D, 3A and 3B creating wet and dry regions 037 and 036 respectively as presented in those Figures. Water collection system 551 may also optionally extend the full footprint where all the air must pass through overlapping gutter assemblies 552 as shown in FIGS. 4A, 4B, 4C and 4D thus creating dry area 036 below overlapping gutter assemblies 552. It should be understood that the angle and length of the overlapping gutter water gutter system 551, the size and of the water collection trough 553, as well as the length and nature of the drain 554, and the width and depth of the sump 021, are not a limitation of the present embodiment.

A twelfth embodiment 600 of the present invention is shown in FIG. 6A describing an arrangement where the spray water caught by overlapping gutter water gutter system 501 drains into sump 606 and note that sump 606 is mounted above fan 026 and fan motor 025. The majority of sump 606 is also mounted outside the footprint of embodiment 600 making serviceability much safer and easier, even while fan 026 and motor 025 of embodiment 600 is in operation. Notice that spray pump 020 is mounting in the portion of sump 606 which is external from the footprint of embodiment 600 which allows for safe inspection and servicing of sump 606, spray pump 020, make-up assembly (not shown), sump strainer (not shown), and sump heater (not shown) through removable inspection door 602 even while fan 026 is in full operation. Removable access door 602 may also be attached via optional hinge assembly 604. Baffle plate 608 insures that air flowing does not leak past the water level preventing water from blowing out sump 606 when being serviced. Another additional benefit of mounting sump 606 and spray pump 020 higher than fan 026 is reduced pumping requirements compared to other embodiments and prior art where the sump and spray pump are mounted at the lowest part of the equipment thus requiring less head to overcome and reducing the power required to run spray pump 020. Angle 01 of the overlapping gutter water collection system 501 is typically greater than 0° and less than 80°, with optimal angle between 1° and 5°. It should be understood that the width and size of sump 606 is not a limitation of the present embodiment. Of particular note is that evaporative indirect heat exchanger 023 may be of the serpentine tube type or may also be of plate coil type 609 as shown and the type of indirect heat exchanger is not a limitation of the invention. In addition any style evaporative heat exchanger falls within the scope of this invention. It should be noted that dry area 036 exists under the entire overlapping gutter water gutter system 501 which leaves plenty of room for serviceability and there can optionally be a service door entering the structure (not shown).

A thirteenth embodiment 610 is shown which is identical to embodiment 600 in FIG. 6A except for embodiment 610 has two fans 026, two motors 025 and divider wall 612.

Figure 6C:
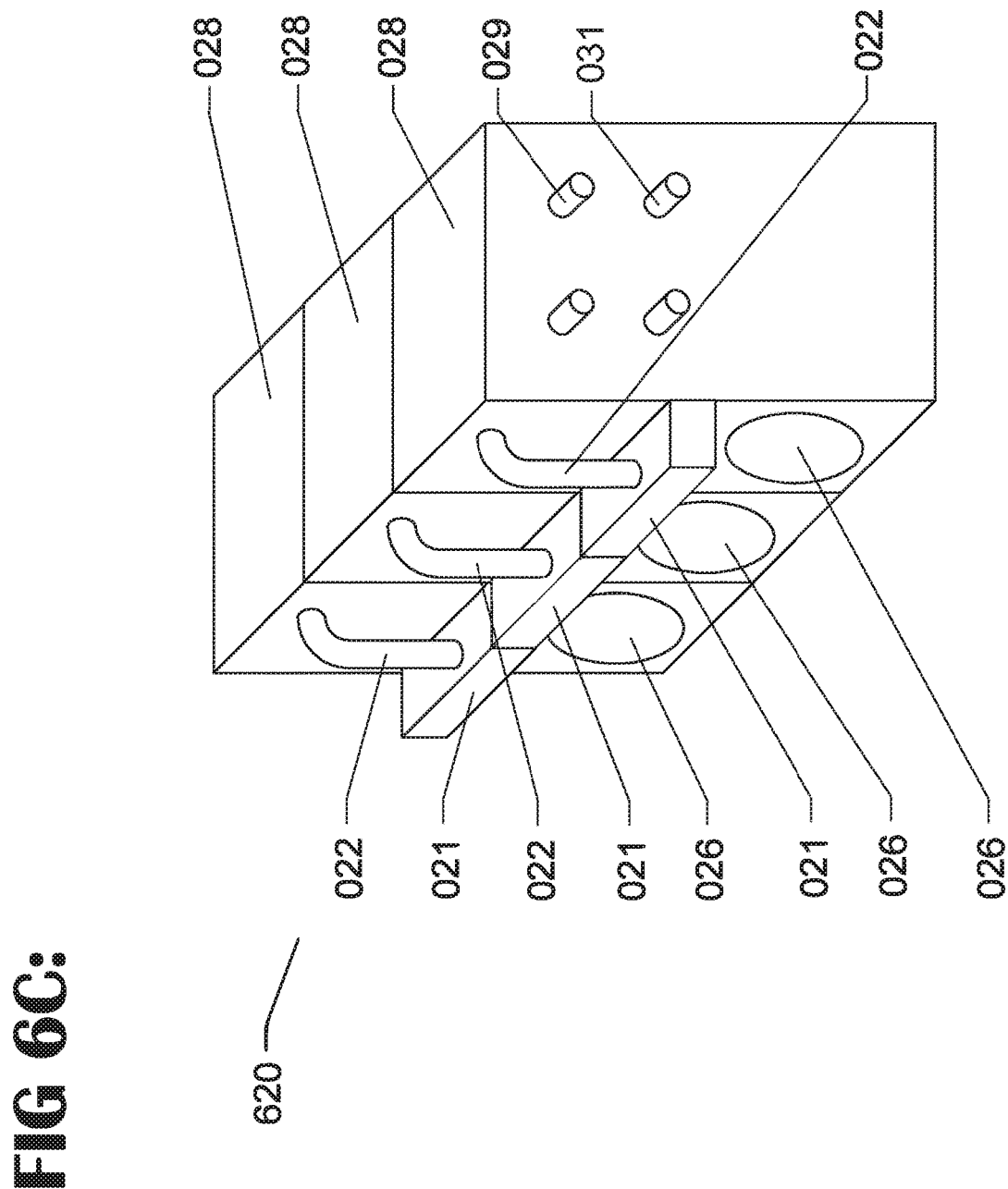
FIG. 6C is a perspective view of an evaporative indirect heat exchanger product in accordance with a fourteenth embodiment of the present invention.

In fourteenth embodiment 620 shown in FIG. 6C, a modular construction of three embodiments 600 from FIG. 6A installed together making field assembly, serviceability and control of various parameters much easier. In this arrangement, embodiment 620 employs three separate heat exchange units such that there are three fans 026, three sumps 021, three spray water distribution pipes 022, three sets of mist eliminators 028 and three evaporative heat exchangers (not shown).

Figure 7A:
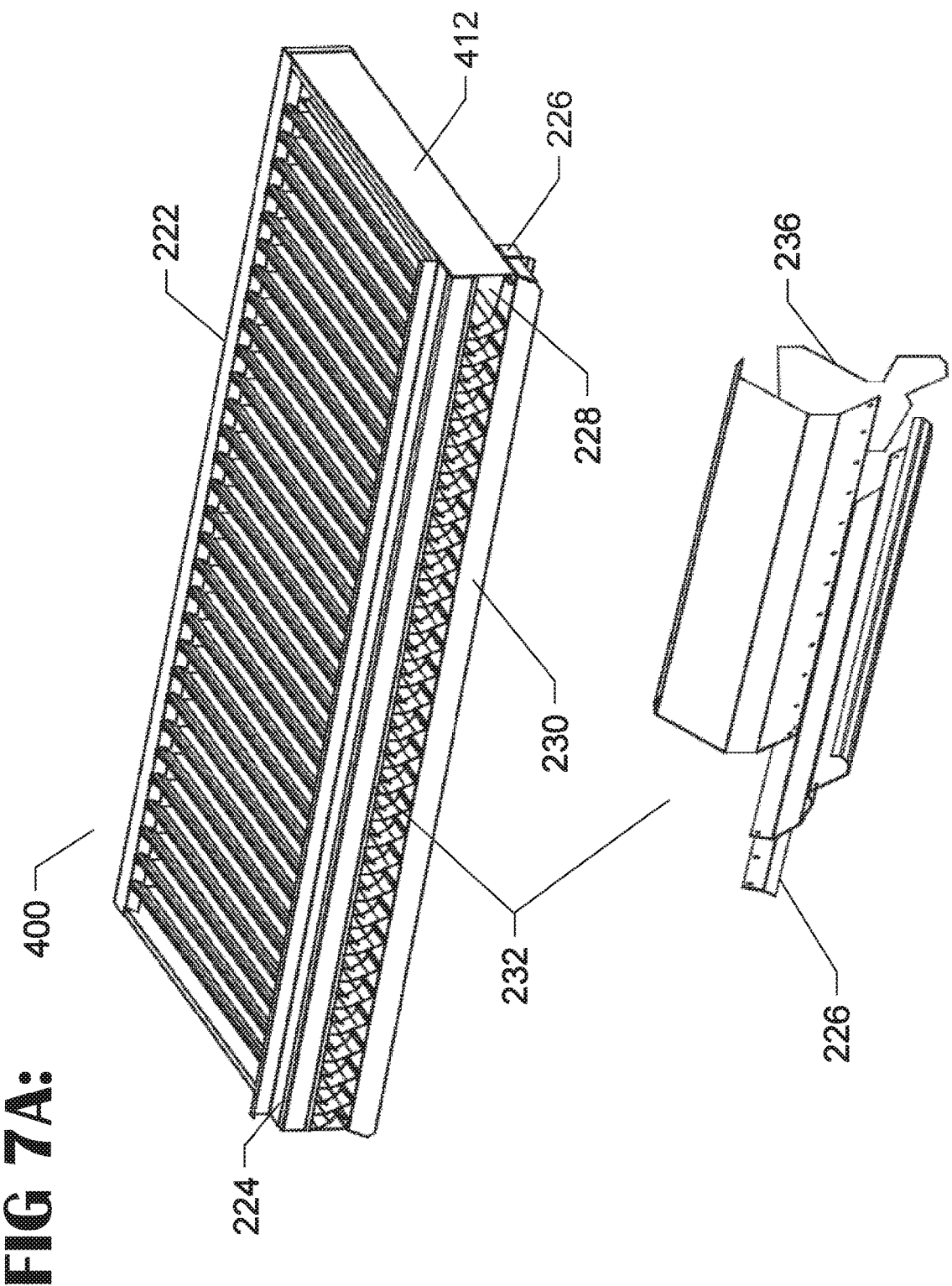
FIG. 7A is a perspective top view of an overlapping gutter water collection system in accordance with a fifteenth embodiment of the present invention.

Referring now to FIG. 7A, a perspective top view of overlapping gutter water collection system 400 is in accordance with a fifteenth embodiment of the present invention. Overlapping gutter water collection system 400 is shown to be comprised of a plurality of four-piece gutter assemblies 232 which can be constructed of sheet metal, plastic or any formable material and can even be printed. Front top frame 224 doubles as an air and water baffle which contains the water and air as desired. Rear frame 222 has comb-like drip edges to allow for good alignment and also funnels the caught spray water to the primary channels (shown in a later figure). Oversized gutter 228 is designed to catch excess spray water against the end of the overlapping gutter water collection system 400. Louver channel 226 has an integrated drip edge to keep water on the wet side of overlapping gutter water collection system 400. Louver channel extension 230 also has an integrated drip edge to keep water contained on the wet side of overlapping gutter water collection system 400. Welded end cap 236 allows for proper sealing against the unit wall to prevent water from leaking down the side wall of the unit. It should be noted that this gutter design can either be a multipart design that needs to be assembled by rivets, glue or by welding or it could be a single-piece extrusion, injection molded part or even 3D printed and the method of assembly or manufacture is not a limitation of the invention. Further, the parts may be made of common materials such as sheet metal or plastics and the type of material used is not a limitation of the invention.

Figure 7B:
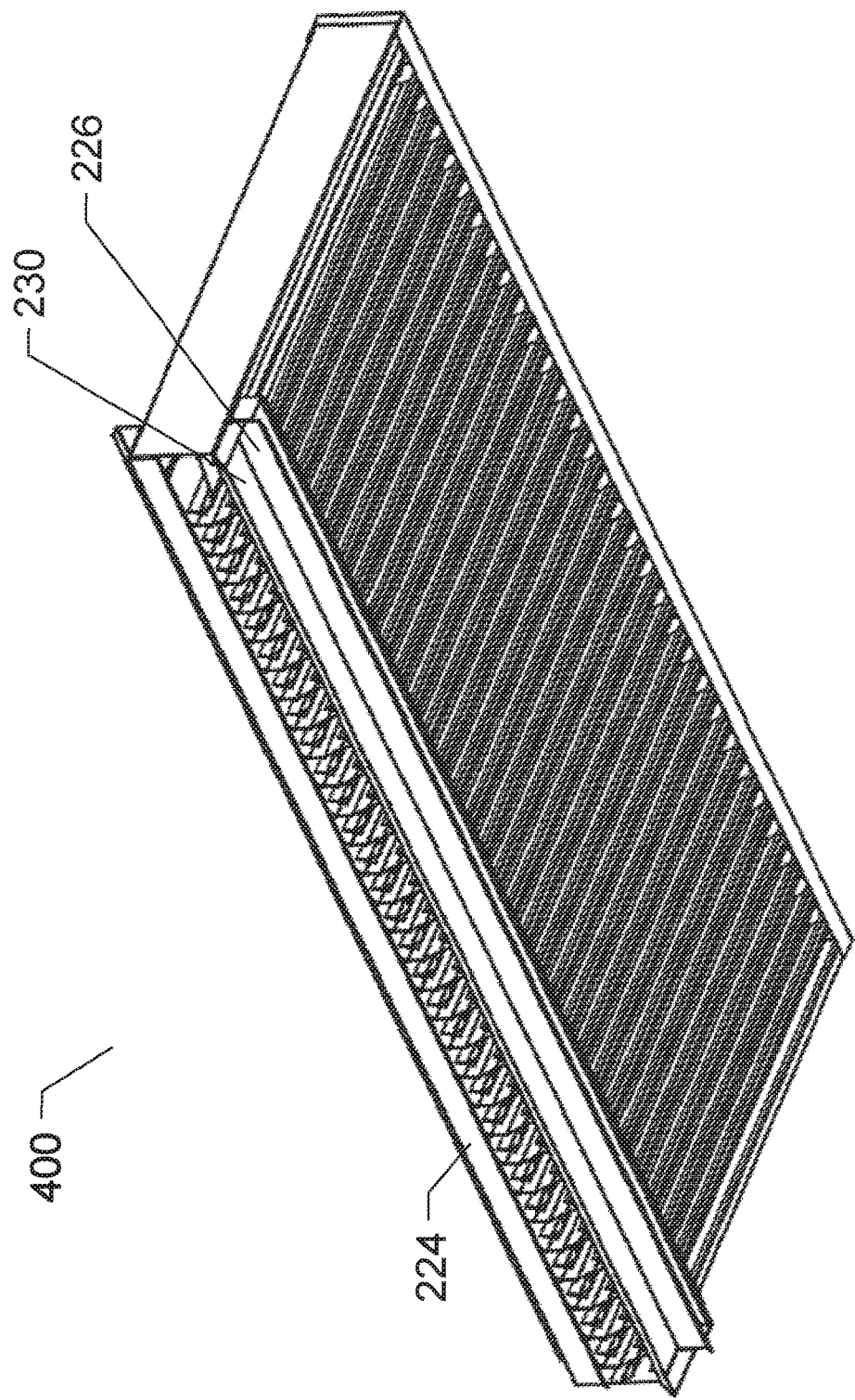
FIG. 7B is a perspective bottom view of a gutter assembly of an overlapping gutter water collection system in accordance with the fifteenth embodiment of the present invention.

Referring now to FIG. 7B, a perspective bottom view of overlapping gutter water collection system 400 is in accordance with the fifteenth embodiment of the present invention. Overlapping gutter water collection system 400 is shown which can be constructed of sheet metal, plastic or any formable material and can even be printed. Front top frame 224 doubles as an air and water baffle which contains the water and air as desired. Louver channel 226 has an integrated drip edge to keep water on the wet side of overlapping gutter water collection system 400. Louver water diverter with channel extension 230 also has an integrated drip edge to keep water contained on the wet side of overlapping gutter water collection system 400.

Figure 8A:
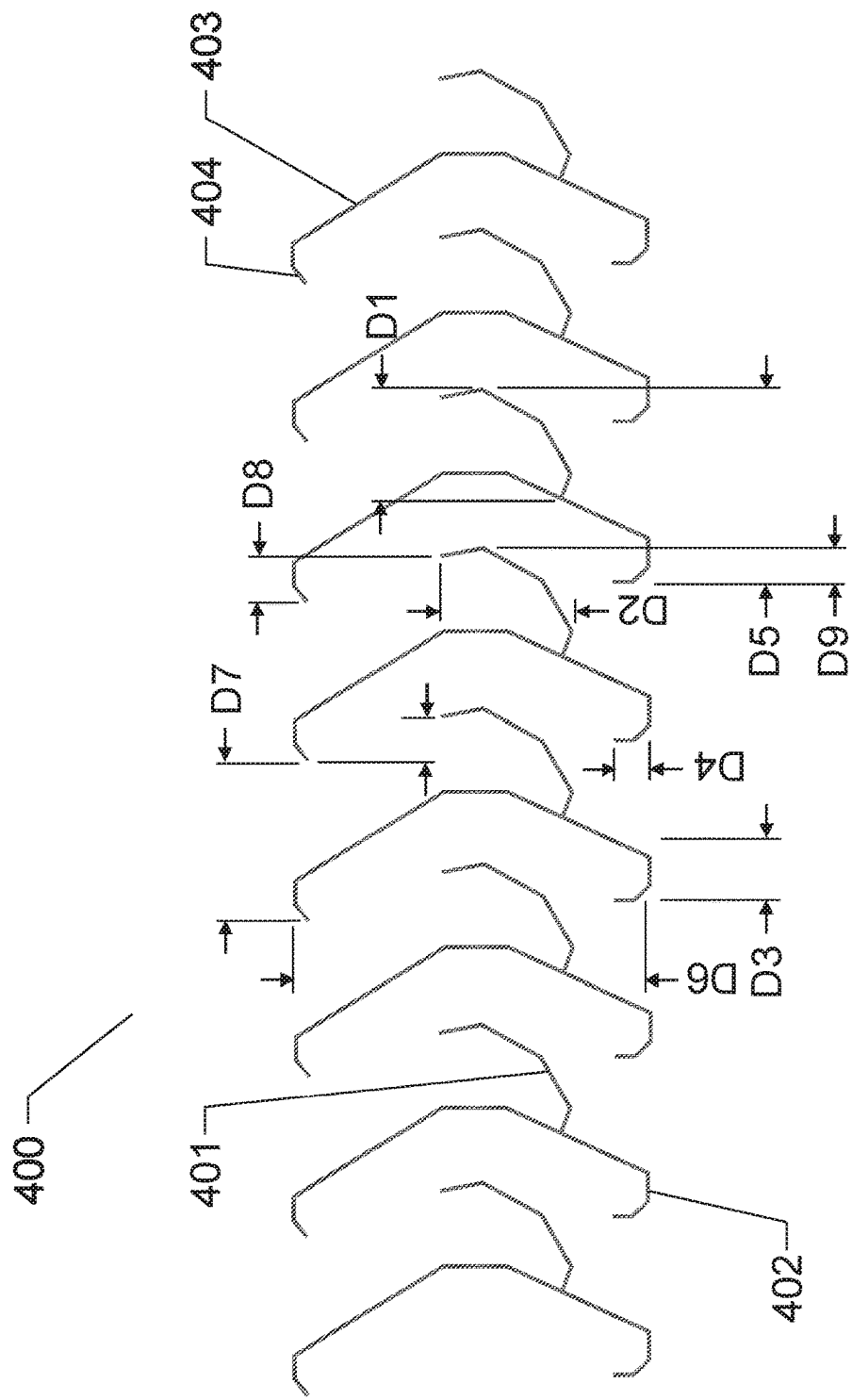
FIG. 8A is a front side view of a sub-section of an overlapping gutter water collection system in accordance with the sixteenth embodiment of the present invention.

A sixteenth embodiment is water collection system 400 shown in FIG. 8A and is designed to collect the spray water flowing from the top side, while letting air flow generally vertically through from the bottom side. Primary water collection channel 401 collects most of the spray water. Secondary water collection channel 402 catches any remaining spray which can be especially prevalent from either splashing, when air velocity is low, when there is no air is flowing through water collection system 400 or during extremely heavy water loading periods. Deflection plate 403 and top drip edge 404 force spray water to primary water collection channel 401. The length, angles, position and shape of the top drip edge 404 are designed to balance water collection performance and limit airside pressure drop through the overlapping gutter water collection system 400. Dimension D1 is typically between 0.5 inch and 12 inches. Dimension D2 is typically between 0.5 inch and 12 inches. Dimension D3 is typically between 0.5 inch and 8 inches. Dimension D4 is typically between 0.5 inch and 8 inches. Dimension D5 is typically between 5 inches and 30 inches. Dimension D6 is typically between 4 inches and 20 inches. Dimension D7 is typically between 4 inches and 20 inches. Dimension D8 is greater than 0 inch to ensure proper drainage of water from top drip edge 404 to primary water collection channel 401. Dimension D9 is greater than 0 inch. It should be understood that dimensions D1 and D2 can be changed to optimize the water collection capacity of the primary water collection channel 401, as well as to ensure non-clogging, and allow for easy inspection and cleaning. Similarly, dimensions D3 and D4 can be changed to optimize the water collection capacity of the secondary water collection channel 402, as well as to ensure non-clogging, and allow for easy inspection and cleaning. The decision on how to define dimensions D5, D6, D7, and D8 is a balance between the acceptable airside pressure drop through the overlapping gutter water collection system 400, the difficulty in degree of manufacturing, and allowable cost and weight of the overlapping gutter water collection system 400. The water collection gutters are installed at an angle to increase water velocity, allow for drainage, and for self-cleaning. The air passages are designed to minimize airside pressure drop while assuring excellent water collection performance.

Figure 8B:
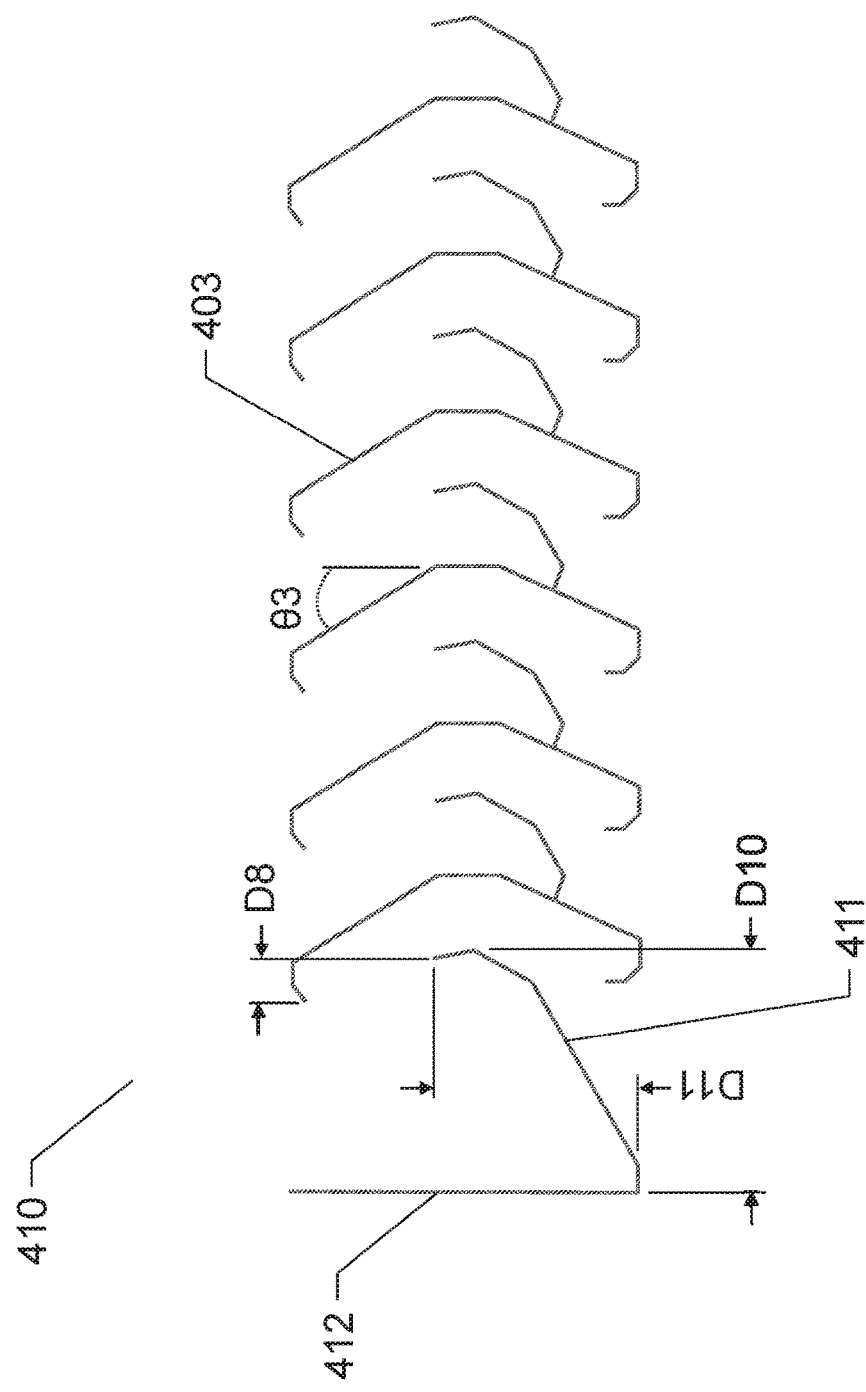
FIG. 8B is a front side view of a sub-section of an overlapping gutter water collection system in accordance with a seventeenth embodiment of the present invention.

Now referring to FIG. 8B, a seventeenth embodiment is shown. In order to increase the water collection efficiency of the overlapping gutter water collection system 400 of the sixteenth embodiment shown in FIG. 8A, embodiment 410 is shown in FIG. 8B with an oversized water collection channel 411 which is attached to the evaporative heat transfer equipment side wall 412. The air entering generally vertically through the bottom of water collection system 410 exists at the top at a non-vertical direction imposed by the angle θ3 of deflection plate 403. This non-vertical air stream deflects some of the spray water towards the unit side wall 412 which can result in an uneven water loading over the water collection system 410. The addition of oversized water collection channel 411, only at side wall 412, provides increased water collection capability thus helping counteract the increased spray water flow rate on one side of the equipment. Width D10 and height D11 of the oversized water collection channel 411, and gutter overlap distance D8 are designed to balance the water collection performance and limit the airside pressure drop through the overlapping gutter water collection system 410 and are not a limitation of this embodiment.

Figure 8C:
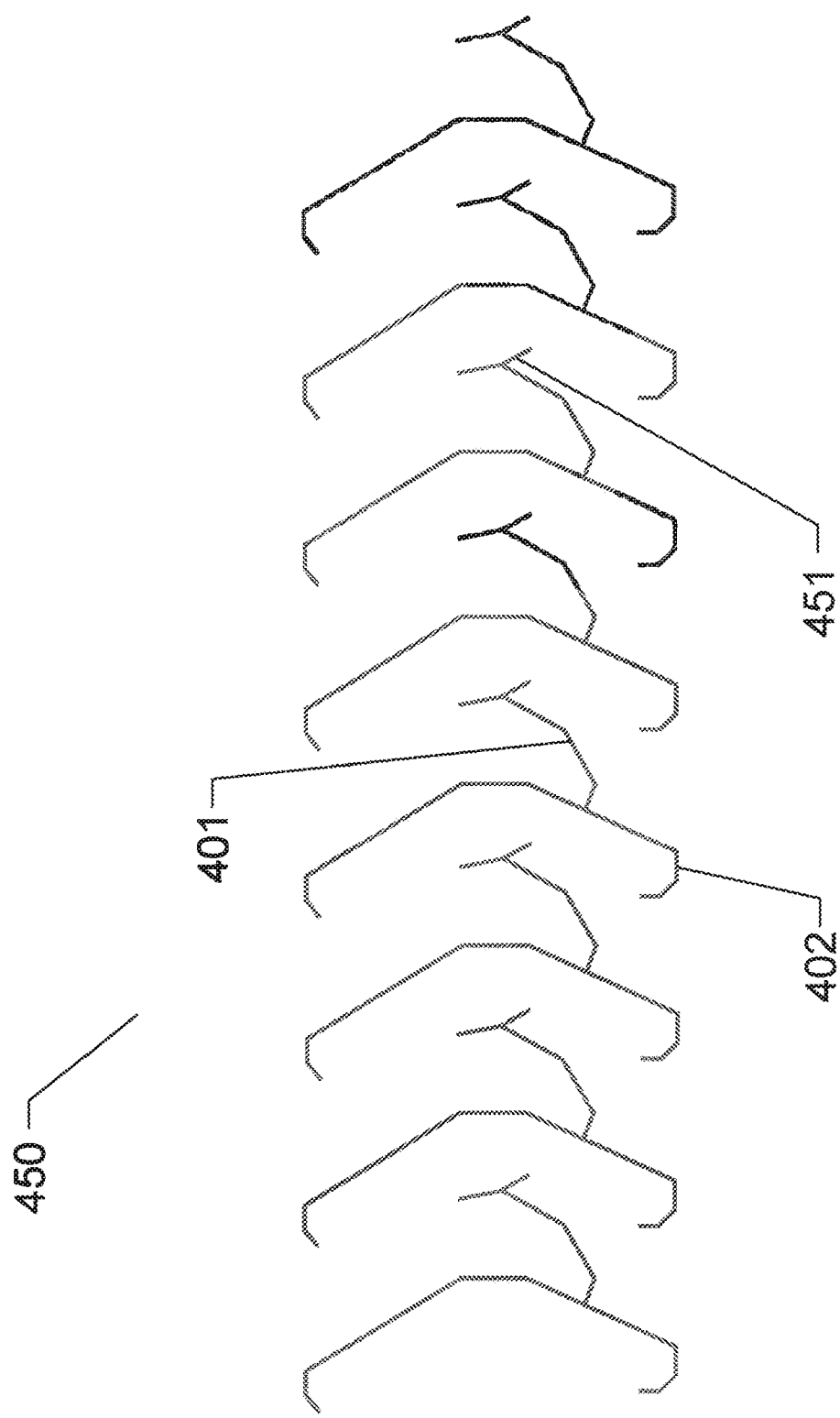
FIG. 8C is a front side views of a sub-section of an overlapping gutter water collection system in accordance with an eighteenth embodiment of the present invention.

In an eighteenth embodiment shown in FIG. 8C, overlapping gutter water collection system 450 is shown with added drip edges 451 to the primary water collection channel 401 to improve water catching performance. Drip edges 451 will be most useful for during high water loading or low air flow situations. The addition of drip edges 451 may increase airside pressure drop. All key dimensions discussed in FIG. 8A can be optimized based on required water loading and airside pressure drop requirements. The length, angle, position and shape of drip edges 451 can be designed to balance the water collection performance and limit the airside pressure drop through the overlapping gutter water collection system 450.

A nineteenth embodiment 460 and twentieth embodiment 470 is shown in FIGS. 8D and 8E respectively. To avoid overflow of the primary water collection channel 401, holes or slots 461 and 471 respectively are added to the design to allow for water to flow from primary channel 401 to secondary water collection channel 402. The optimal hole or slot size and interval is a function of channel size, water flow rate and air flow rate. To allow for higher water loading capacity, secondary water collection channel 402 volume could be increased by increasing both channel depth D4 and width D3.

Figure 8F:
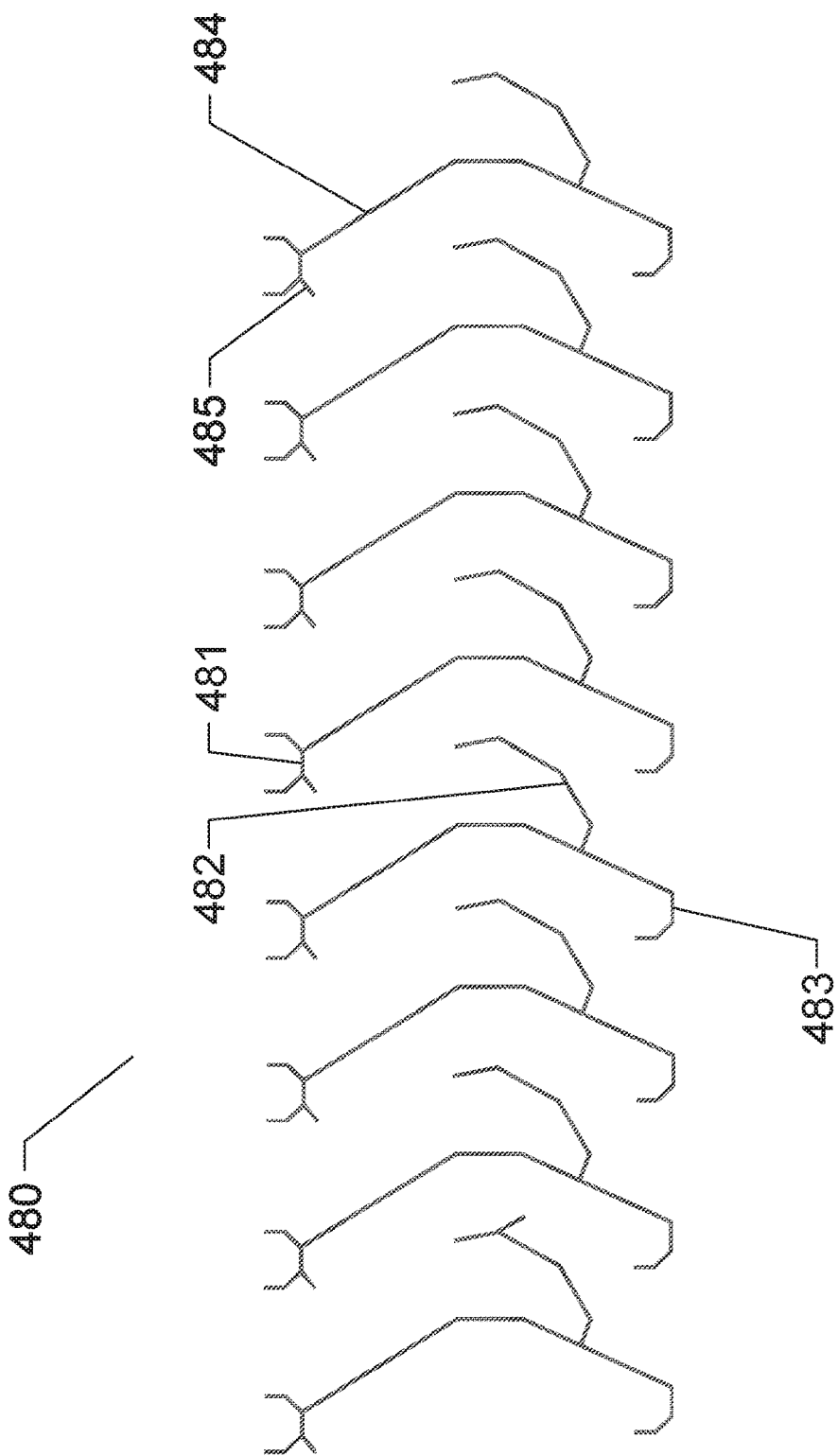
FIG. 8F is a side view of a sub-section of an overlapping gutter water collection system in accordance with a twenty-first embodiment of the present invention.

In FIG. 8F, twenty-first embodiment 480 includes tertiary water collection channel 481 to increase the total water collection volume of each gutter. The size of the primary water collection channel 482 and secondary water collection channel 483 can be decreased to increase airflow through the water collection system 480 while keeping the water collection volume equal to that the water collection system not employing the tertiary water collection channel 481.

Figure 8G:
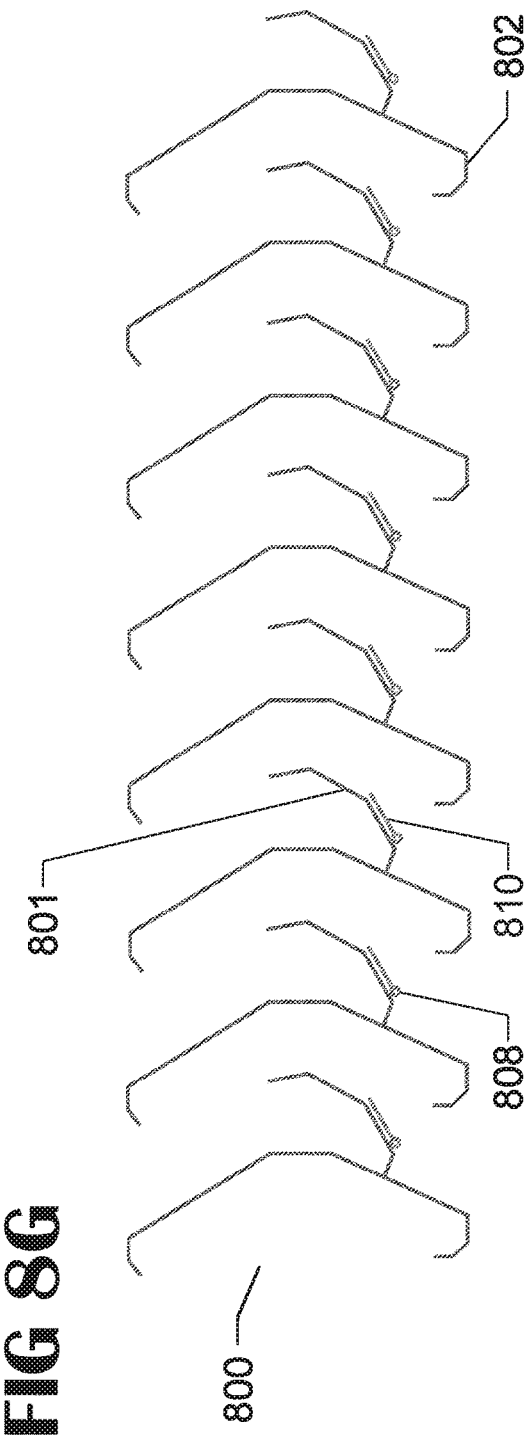
FIG. 8G is a front side view of a sub-section of an overlapping gutter water collection system in accordance with a twenty-second embodiment of the present invention.
Figure 8H:
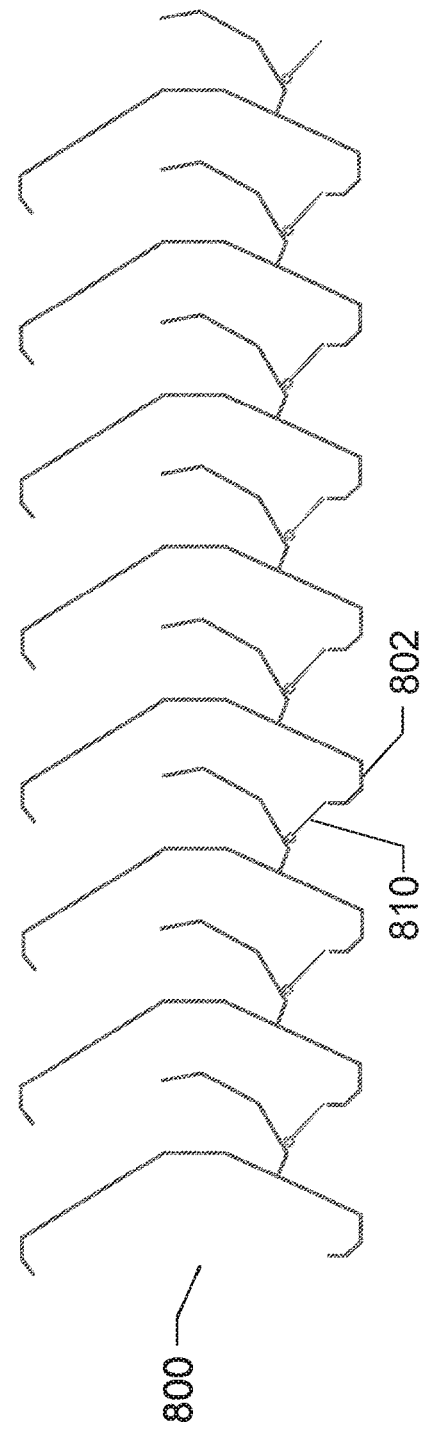
FIG. 8H is a front side view of a sub-section of an overlapping gutter water collection system in accordance with a twenty-second embodiment of the present invention.

In FIGS. 8G and 8H, twenty-second embodiment 800 is shown with integral dampers 810 in the open and closed positions, respectively. Damper 810 is forced in the open (up) position when sufficient airflow is flowing through water collection system 800 and closes by gravity when the fan is off. Integral dampers 810 may also be motorized (not shown). Integral dampers 810 are affixed to primary water channel 801 via hinge 808. Dampers 810, when closed, will prevent water splash-out during extremely low fan speeds and also when the fan is off, by deflecting spray water toward the secondary water collection channel 802. Integral dampers 810, when closed during subfreezing temperatures, help prevent ice formation and help to keep the indirect heat exchanger from freezing as well by preventing natural airflow when the fan is off. Integral dampers 810 could be part an integral part of the design with mounting holes as part of the gutter design, could be an add-on, could be mounted to the end caps (as defined in FIG. 7A, part 236), or as a stand-alone module and is not a limitation of the invention.

In FIGS. 8I and 8J, twenty-third embodiment 850 is shown with integral dampers 860 in the open and closed positions, respectively. As in twenty-second embodiment 800 shown in FIGS. 8G and 8H, damper 860 is forced in the open (up) position when sufficient airflow is flowing through water collection system 850 and closes by gravity when the fan is off. Integral dampers 860 may also be motorized (not shown). Integral dampers 860 are affixed to deflection plate 853 via hinge 858. Dampers 860, when closed, will prevent water splash-out during extremely low fan speeds and also when the fan is off, by deflecting spray water toward the primary water collection channel 851. Integral dampers 860, when closed during subfreezing temperatures, help prevent ice formation and help to keep the indirect heat exchanger from freezing as well by preventing natural airflow when the fan is off Integral dampers 860 could be part an integral part of the design with mounting holes as part of the gutter design, could be an add-on, could be mounted to the end caps (as defined in FIG. 7A, part 236), or as a stand-alone module and is not a limitation of the invention.

What is claimed is:

1. A cooling tower comprising:
    an outer structure;
    an evaporative heat exchanger in the outer structure comprising an indirect heat exchanger, the indirect heat exchanger comprising an inlet to receive process fluid and an outlet for the process fluid;
    a fan assembly;
    an evaporative liquid distribution assembly in the outer structure, the evaporative liquid distribution assembly configured to distribute evaporative liquid onto the evaporative heat exchanger;
    a gutter assembly in the outer structure, the gutter assembly configured to collect at least a portion of the distributed evaporative fluid from the evaporative heat exchanger;
    a sump configured to receive the collected fluid from the gutter assembly;
    a first portion of the sump in the outer structure;
    a second portion of the sump external to the outer structure, the sump allowing collected evaporative fluid to flow from the first portion of the sump to the second portion of the sump;
    the second portion of the sump permitting access to the collected evaporative fluid in the second portion of the sump during operation of the cooling tower;
    a pump configured to pump the evaporative fluid from the second portion of the sump to the evaporative liquid distribution assembly;
    wherein the cooling tower is a closed loop cooling tower having a first circuit for the process fluid and a second circuit for the evaporative liquid that is independent of the first circuit; and
    wherein the first circuit includes the indirect heat exchanger and wherein the second circuit includes the evaporative liquid distribution assembly, the sump, and the pump.

2. The cooling tower of claim 1 wherein the sump includes a baffle configured to inhibit air in the outer structure from entering the second portion of the sump.

3. The cooling tower of claim 1 wherein the cooling tower has an upper end, a lower end, and a height extending therebetween; and
wherein the sump is intermediate the evaporative heat exchanger and the fan assembly along the height of the cooling tower.

4. The cooling tower of claim 1 wherein the pump is at least partially in the second portion of the sump.

5. The cooling tower of claim 1 wherein the gutter assembly is sloped toward the first portion of the sump and extends at an angle greater than one degree from the horizontal.

6. The cooling tower of claim 1 wherein the gutter assembly is comprised of a plurality of adjacent channel structures;
wherein each channel structure is comprised of a primary collection channel and a secondary collection channel;
wherein each primary collection channel includes a first end and each secondary collection channel includes a first end; and
wherein the first end of the primary collection channel of one channel structure extends above and laterally overlaps with the first end of the secondary collection channel of an adjacent channel structure.

7. The cooling tower of claim 1 wherein the evaporative heat exchanger includes:
fill sheets;
a serpentine tube coil; and/or
a plate heat exchanger.

8. The cooling tower of claim 1 wherein the outer structure has a footprint; and
wherein the first portion of the sump is smaller than the footprint of the outer structure.

9. The cooling tower of claim 1 wherein the indirect heat exchanger comprises:
a plate style heat exchanger; and/or
a serpentine tube coil.

10. A cooling tower comprising:
an outer structure;
an evaporative heat exchanger in the outer structure;
a fan assembly;
an evaporative liquid distribution assembly in the outer structure, the evaporative liquid distribution assembly configured to distribute evaporative liquid onto the evaporative heat exchanger;
a gutter assembly in the outer structure, the gutter assembly configured to collect at least a portion of the distributed evaporative fluid from the evaporative heat exchanger;
a sump configured to receive the collected fluid from the gutter assembly;
a first portion of the sump in the outer structure;
a second portion of the sump external to the outer structure, the sump allowing collected evaporative fluid to flow from the first portion of the sump to the second portion of the sump;
the second portion of the sump permitting access to the collected evaporative fluid in the second portion of the sump during operation of the cooling tower;
wherein the second portion of the sump includes an opening; and
an access door covers the opening of the sump second portion.

11. A cooling tower comprising:
an outer structure;
an evaporative heat exchanger in the outer structure;
a fan assembly;
an evaporative liquid distribution assembly in the outer structure, the evaporative liquid distribution assembly configured to distribute evaporative liquid onto the evaporative heat exchanger;
a gutter assembly in the outer structure, the gutter assembly configured to collect at least a portion of the distributed evaporative fluid from the evaporative heat exchanger;
a sump configured to receive the collected fluid from the gutter assembly;
a first portion of the sump in the outer structure;
a second portion of the sump external to the outer structure, the sump allowing collected evaporative fluid to flow from the first portion of the sump to the second portion of the sump; and
the second portion of the sump permitting access to the collected evaporative fluid in the second portion of the sump during operation of the cooling tower;
wherein the gutter assembly is comprised of a plurality of adjacent channel structures;
wherein each channel structure is comprised of a primary collection channel and a secondary collection channel;
wherein each primary collection channel includes a first end and each secondary collection channel includes a first end;
wherein the first end of the primary collection channel of one channel structure extends above and laterally overlaps with the first end of the secondary collection channel of an adjacent channel structure; and
wherein each channel structure includes a deflection section having a first end, wherein the first end of at least one deflection section of one channel structure extends above and laterally overlaps with the first end of a primary collection channel of an adjacent channel structure.

12. A cooling tower having an upper end, a lower end, and a height extending therebetween, the cooling tower comprising:
an evaporative heat exchanger;
at least one fan assembly below the heat exchanger;
a sump intermediate the evaporative heat exchanger and the at least one fan assembly along the height of the cooling tower;
an evaporative liquid distribution assembly above the evaporative heat exchanger, the evaporative liquid distribution assembly configured to distribute evaporative fluid onto the evaporative heat exchanger; and
a gutter assembly configured to collect at least a portion of the distributed evaporative liquid from the evaporative heat exchanger and direct the collected evaporative liquid into the sump;
wherein the gutter assembly comprises:
a plurality of elongate channel structures each having a first end portion, a second end portion opposite the first end portion, and a longitudinal length extending therebetween;
a first frame extending laterally relative to the elongate channel structures and supporting the first end portions of the elongate channel structures; and
a second frame extending laterally relative to the elongate channel structures and supporting the second end portions of the elongate channel structures.

13. The cooling tower of claim 12 wherein the gutter assembly is intermediate the evaporative heat exchanger and the at least one fan assembly along the height of the cooling tower.

14. The cooling tower of claim 12 wherein the sump includes a portion extending laterally over the at least one fan assembly.

15. The cooling tower of claim 12 further comprising a pump intermediate the evaporative heat exchanger and the at least one fan assembly along the height of the cooling tower, the pump configured to pump evaporative fluid from the sump to the evaporative liquid distribution assembly.

16. The cooling tower of claim 15 wherein at least a portion of the pump is in the sump.

17. The cooling tower of claim 12 further comprising an outer structure;
wherein the evaporative heat exchanger, evaporative liquid distribution assembly, and the gutter assembly are in the outer structure.

18. The cooling tower of claim 17 wherein the sump includes a first portion in the outer structure and a second portion outside of the outer structure.

19. The cooling tower of claim 18 wherein the sump includes a baffle configured to inhibit air in the outer structure from entering the second portion of the sump.

20. The cooling tower of claim 18 wherein the outer structure has a footprint; and
wherein the first portion of the sump is smaller than the footprint of the outer structure.

21. The cooling tower of claim 12 wherein the elongate channel structures are sloped so that the first end portions are lower than the second end portions; and
wherein the first frame defines at least one opening through which the collected evaporative liquid travels as the collected evaporative liquid is directed into the sump.

22. The cooling tower of claim 12 wherein the gutter assembly is sloped toward the sump and extends at an angle greater than one degree from the horizontal.

23. The cooling tower of claim 12
wherein each elongate channel structure is comprised of a primary collection channel and a secondary collection channel;
wherein each primary collection channel includes a first end and each secondary collection channel includes a first end; and
wherein the first end of the primary collection channel of one elongate channel structure extends above and laterally overlaps with the first end of the secondary collection channel of an adjacent elongate channel structure.

24. The cooling tower of claim 12 wherein the evaporative heat exchanger includes:
fill sheets;
a plate style heat exchanger; and/or
a serpentine tube coil.

25. A cooling tower having an upper end, a lower end, and a height extending therebetween, the cooling tower comprising:
an evaporative heat exchanger;
at least one fan assembly below the heat exchanger;
a sump intermediate the evaporative heat exchanger and the at least one fan assembly along the height of the cooling tower;
an evaporative liquid distribution assembly above the evaporative heat exchanger, the evaporative liquid distribution assembly configured to distribute evaporative fluid onto the evaporative heat exchanger;
a gutter assembly configured to collect at least a portion of the distributed evaporative liquid from the evaporative heat exchanger and direct the collected evaporative liquid into the sump; and
an access door covering at least a portion of the sump.

26. A cooling tower having an upper end, a lower end, and a height extending therebetween, the cooling tower comprising:
an outer structure;
an evaporative heat exchanger in the outer structure;
at least one fan assembly;
an evaporative liquid distribution assembly in the outer structure, the evaporative liquid distribution assembly configured to distribute evaporative liquid onto the evaporative heat exchanger;
a gutter assembly in the outer structure, the gutter assembly configured to collect at least a portion of the distributed evaporative fluid from the evaporative heat exchanger;
a sump intermediate the evaporative heat exchanger and the at least one fan assembly along the height of the cooling tower;
a first portion of the sump in the outer structure configured to receive the collected evaporative fluid from the gutter assembly;
a second portion of the sump external to the outer structure, the sump permitting collected evaporative fluid to flow from the first portion of the sump to the second portion of the sump; and
a pump external to the outer structure and above the fan assembly along the height of the cooling tower, the pump operable to pump evaporative liquid from the second portion of the sump toward the evaporative liquid distribution assembly.

27. The cooling tower of claim 26 wherein at least a portion of the pump is in the second portion of the sump.

28. The cooling tower of claim 26 wherein the sump includes a baffle inhibiting air in the outer structure from entering the second portion of the sump.

29. The cooling tower of claim 26 wherein the gutter assembly is sloped toward the first portion of the sump and extends at an angle greater than one degree from the horizontal.

30. The cooling tower of claim 26 wherein the gutter assembly is comprised of a plurality of adjacent channel structures;
wherein each channel structure is comprised of a primary collection channel and a secondary collection channel;
wherein each primary collection channel includes a first end and each secondary collection channel has a first end; and
wherein the first end of the primary collection channel of one channel structure extends above and laterally overlaps with the first end of a secondary collection channel of an adjacent channel structure.

31. The cooling tower of claim 26 wherein the evaporative heat exchanger includes:
fill sheets;
a plate style heat exchanger; and/or
a serpentine tube coil.

32. A cooling tower having an upper end, a lower end, and a height extending therebetween, the cooling tower comprising
an outer structure;
an evaporative heat exchanger in the outer structure;

at least one fan assembly;

an evaporative liquid distribution assembly in the outer structure, the evaporative liquid distribution assembly configured to distribute evaporative liquid onto the evaporative heat exchanger;

a gutter assembly in the outer structure, the gutter assembly configured to collect at least a portion of the distributed evaporative fluid from the evaporative heat exchanger;

a sump intermediate the evaporative heat exchanger and the at least one fan assembly along the height of the cooling tower;

a first portion of the sump in the outer structure configured to receive the collected evaporative fluid from the gutter assembly; and a second portion of the sump external to the outer structure, the sump permitting collected evaporative fluid to flow from the first portion of the sump to the second portion of the sump; and an access door covering at least a portion of the second portion of the sump.

33. A cooling tower having an upper end, a lower end, and a height extending therebetween, the cooling tower comprising:

an outer structure;

an evaporative heat exchanger in the outer structure;

at least one fan assembly;

an evaporative liquid distribution assembly in the outer structure, the evaporative liquid distribution assembly configured to distribute evaporative liquid onto the evaporative heat exchanger;

a gutter assembly in the outer structure, the gutter assembly configured to collect at least a portion of the distributed evaporative fluid from the evaporative heat exchanger;

a sump intermediate the evaporative heat exchanger and the at least one fan assembly along the height of the cooling tower;

a first portion of the sump in the outer structure configured to receive the collected evaporative fluid from the gutter assembly; and a second portion of the sump external to the outer structure, the sump permitting collected evaporative fluid to flow from the first portion of the sump to the second portion of the sump;

wherein the gutter assembly is comprised of a plurality of adjacent channel structures;

wherein each channel structure is comprised of a primary collection channel and a secondary collection channel;

wherein each primary collection channel includes a first end and each secondary collection channel has a first end;

wherein the first end of the primary collection channel of one channel structure extends above and laterally overlaps with the first end of a secondary collection channel of an adjacent channel structure; and wherein each channel structure includes a deflection section having a first end, wherein the first end of at least one deflection section of one channel structure extends above and laterally overlaps with the first end of a primary collection channel of an adjacent channel structure.

* * * * *